US010834272B2

(12) United States Patent
Nakazawa et al.

(10) Patent No.: US 10,834,272 B2
(45) Date of Patent: Nov. 10, 2020

(54) READING DEVICE, IMAGE FORMING APPARATUS INCLUDING SAME, AND READING METHOD

(71) Applicants: Masamoto Nakazawa, Kanagawa (JP); Tadaaki Oyama, Kanagawa (JP); Masahiro Itoh, Kanagawa (JP); Masato Tanaka, Tokyo (JP)

(72) Inventors: Masamoto Nakazawa, Kanagawa (JP); Tadaaki Oyama, Kanagawa (JP); Masahiro Itoh, Kanagawa (JP); Masato Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/533,984

(22) Filed: Aug. 7, 2019

(65) Prior Publication Data
US 2020/0053233 A1 Feb. 13, 2020

(30) Foreign Application Priority Data

Aug. 10, 2018 (JP) .................................. 2018-152122
Dec. 11, 2018 (JP) .................................. 2018-232036

(51) Int. Cl.
*H04N 1/00* (2006.01)
(52) U.S. Cl.
CPC ..... *H04N 1/00241* (2013.01); *H04N 1/00798* (2013.01)
(58) Field of Classification Search
CPC ........... H04N 1/00241; H04N 1/00798; H04N 1/40056; H04N 5/332; H04N 1/4097; H04N 1/486; H04N 2201/0408; H04N 1/195; H04N 1/4074; H04N 1/409; H04N 1/03; H04N 1/04; H04N 1/1017; H04N 1/193; H04N 2201/02493; H04N 2201/0416;
(Continued)

(56) References Cited

U.S. PATENT DOCUMENTS 2,959,678 A * 11/1960 Jones ..................... G02B 23/12
                                                        250/330
10,542,184 B2 * 1/2020 Yokoyama ............. H04N 5/367
(Continued)

FOREIGN PATENT DOCUMENTS

| JP | 2003-110823 | 4/2003 |
| JP | 2005-143134 | 6/2005 |
| WO | WO 2017/222021 A1 | 12/2017 |

OTHER PUBLICATIONS

Extended European Search Report dated Jan. 7, 2020 in Patent Application No. 19189947.5, citing documents AA-AF and AO therein, 6 pages.
(Continued)

*Primary Examiner* — Negussie Worku
(74) *Attorney, Agent, or Firm* — Oblon, McClelland, Maier & Neustadt, L.L.P.

(57) ABSTRACT

A reading device includes an imaging element and correcting circuitry. The imaging element is configured to receive light from an object selectively irradiated with visible light or invisible light. The correcting circuitry is configured to apply correction processing based on a difference in an optical characteristic between an invisible light region and a visible light region to an image signal in the invisible light region output from the imaging element and output the image signal corrected.

30 Claims, 25 Drawing Sheets

(58) Field of Classification Search
CPC ........... H04N 2201/0454; H04N 5/253; G02B 23/1221; G06T 2207/30108; G06T 7/0004
USPC .......................................................... 358/471
See application file for complete search history.

(56) References Cited

U.S. PATENT DOCUMENTS

| | | | |
|---|---|---|---|
| 10,609,244 B2* | 3/2020 | Nakazawa | H04N 5/00 |
| 10,721,373 B2* | 7/2020 | Konno | H04N 9/045 |
| 2002/0168116 A1* | 11/2002 | Takayama | H04N 1/40056 382/275 |
| 2005/0067944 A1 | 3/2005 | Masuda et al. | |
| 2007/0188638 A1 | 8/2007 | Nakazawa et al. | |
| 2008/0218724 A1 | 9/2008 | Nishina et al. | |
| 2008/0252787 A1 | 10/2008 | Nakazawa et al. | |
| 2008/0278779 A1 | 11/2008 | Nishina et al. | |
| 2009/0065679 A1 | 3/2009 | Tanimoto | |
| 2009/0213440 A1 | 8/2009 | Nishina et al. | |
| 2009/0237750 A1 | 9/2009 | Tatsuno et al. | |
| 2009/0323139 A1 | 12/2009 | Itoh et al. | |
| 2010/0007929 A1 | 1/2010 | Ono et al. | |
| 2010/0020367 A1 | 1/2010 | Abe et al. | |
| 2010/0027061 A1 | 2/2010 | Nakazawa | |
| 2010/0027079 A1 | 2/2010 | Nishina et al. | |
| 2010/0171998 A1 | 7/2010 | Nakazawa | |
| 2010/0214630 A1 | 8/2010 | Takaura et al. | |
| 2010/0289885 A1* | 11/2010 | Lu | H04N 5/2258 348/61 |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2011/0249069 A1 | 10/2011 | Oyama | |
| 2012/0224205 A1 | 9/2012 | Nakazawa | |
| 2012/0236373 A1 | 9/2012 | Oyama | |
| 2013/0063792 A1 | 3/2013 | Nakazawa | |
| 2013/0215482 A1 | 8/2013 | Takaura et al. | |
| 2013/0242362 A1 | 9/2013 | Nakayama et al. | |
| 2014/0029065 A1 | 1/2014 | Nakazawa | |
| 2014/0043662 A1 | 2/2014 | Nakayama et al. | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0218538 A1 | 8/2014 | Choi | |
| 2014/0368893 A1 | 12/2014 | Nakazawa et al. | |
| 2015/0098117 A1 | 4/2015 | Marumoto et al. | |
| 2015/0116794 A1 | 4/2015 | Nakazawa | |
| 2015/0163378 A1 | 6/2015 | Konno et al. | |
| 2015/0222790 A1 | 8/2015 | Asaba et al. | |
| 2015/0249762 A1 | 9/2015 | Ishida et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0065865 A1 | 3/2016 | Shiokawa et al. | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0173790 A1* | 6/2016 | Ishihara | H04N 9/67 348/164 |
| 2016/0268330 A1 | 9/2016 | Nakazawa et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0013962 A1* | 1/2018 | Chang | H01L 27/14649 |
| 2018/0040109 A1 | 2/2018 | Hayashi et al. | |
| 2018/0055391 A1* | 3/2018 | Murakami | A61B 5/0013 |
| 2018/0069996 A1 | 3/2018 | Shukla et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2018/0270425 A1* | 9/2018 | Li | H04N 5/23296 |
| 2019/0068929 A1* | 2/2019 | Sato | H04N 9/04553 |
| 2019/0124271 A1* | 4/2019 | Sato | H04N 5/2354 |
| 2019/0163112 A1 | 5/2019 | Nikaku et al. | |
| 2019/0188838 A1* | 6/2019 | Nie | G06T 5/50 |
| 2019/0208146 A1 | 7/2019 | Tsukada | |
| 2019/0238702 A1 | 8/2019 | Ikemoto et al. | |
| 2020/0053229 A1* | 2/2020 | Hashimoto | H04N 1/40056 |

OTHER PUBLICATIONS

U.S. Appl. No. 16/269,592 filed Feb. 7, 2019, Masamoto Nakazawa, et al.

\* cited by examiner

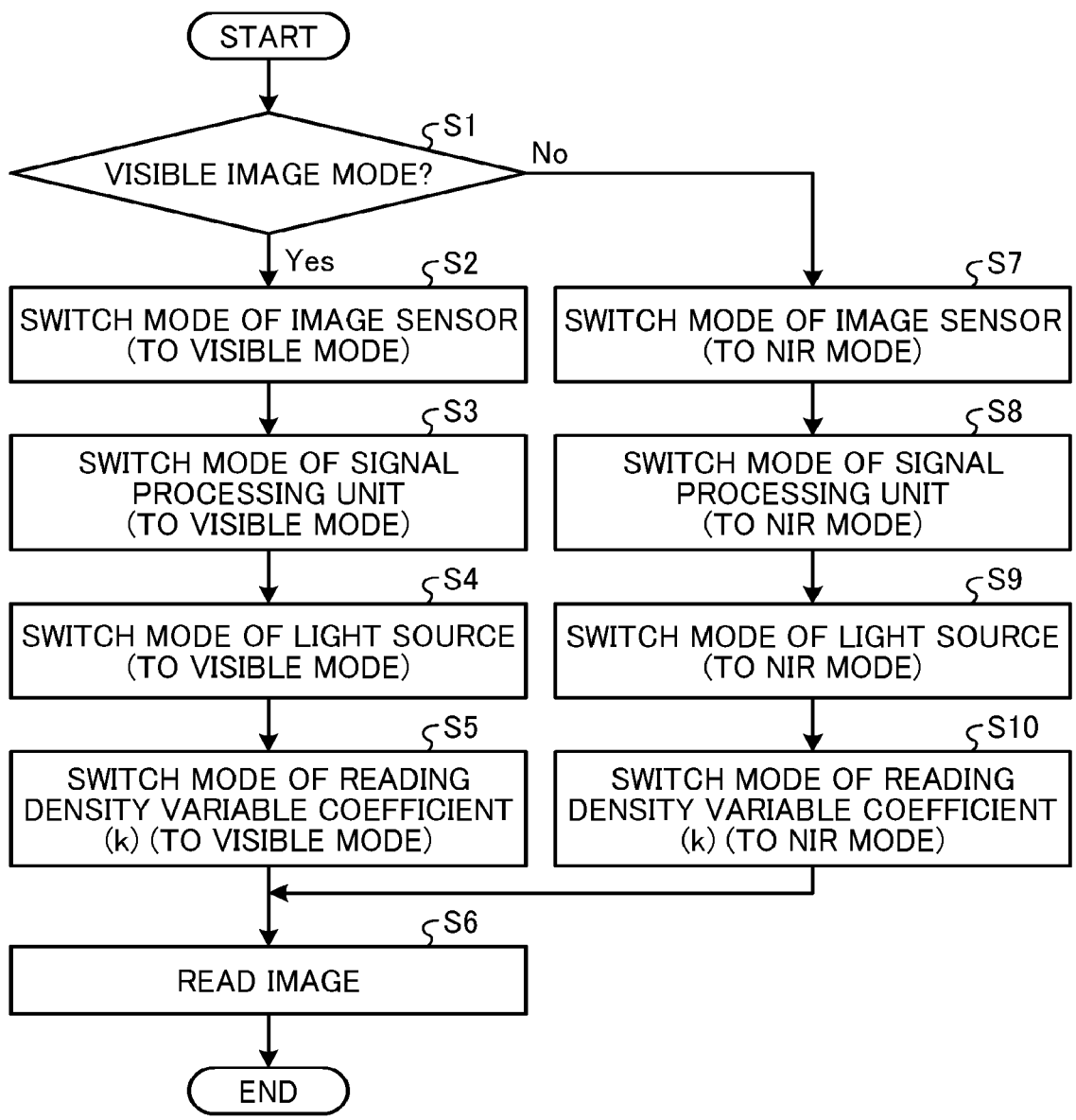

READING DEVICE, IMAGE FORMING APPARATUS INCLUDING SAME, AND READING METHOD

CROSS-REFERENCE TO RELATED APPLICATIONS

This patent application is based on and claims priority pursuant to 35 U.S.C. § 119(a) to Japanese Patent Application Nos. 2018-152122, filed on Aug. 10, 2018, and 2018-232036, filed on Dec. 11, 2018, in the Japan Patent Office, the entire disclosure of each of which is hereby incorporated by reference herein.

BACKGROUND

Technical Field

Aspects of the present disclosure relate to a reading device, an image forming apparatus including the reading device, and a reading method.

Related Art

In recent years, the security awareness of documents has increased, and in particular, there have increased needs such as security of originality and judgment of authenticity of documents.

For example, there is known an invisible information reading technology for embedding invisible information into a document and reading the invisible information with invisible light such as infrared light to secure the originality, determine the authenticity, and prevent forgery.

SUMMARY

In an aspect of the present disclosure, there is provided a reading device that includes an imaging element and correcting circuitry. The imaging element is configured to receive light from an object selectively irradiated with visible light or invisible light. The correcting circuitry is configured to apply correction processing based on a difference in an optical characteristic between an invisible light region and a visible light region to an image signal in the invisible light region output from the imaging element and output the image signal corrected.

In another aspect of the present disclosure, there is provided a reading device configured to receive and read, by an imaging element, light from an object irradiated with light by a light source. The reading device includes correcting circuitry configured to individually set a reading density range of the object in correction in a first reading operation for executing the correction using first reference data, for data of the object read in a visible light region, or a second reading operation for executing the correction using second reference data, for data of the object read in an invisible light region.

In still another aspect of the present disclosure, there is provided an image forming apparatus that includes the reading device according to any of the above-described aspects, a document support device, and an image forming device. The document support device is configured to position a document with an image to be read by the reading device to a reading position of the reading device. The image forming device is configured to form the image read by the reading device.

In still yet another aspect of the present disclosure, there is provided a reading method that includes applying correction processing based on a difference in an optical characteristic between an invisible light region and a visible light region to an image signal in the invisible light region output from an imaging element configured to receive light from an object selectively irradiated with visible light or invisible light; and outputting the image signal.

In still yet another aspect of the present disclosure, there is provided a reading method for a reading device configured to receive and read, by an imaging element, light from an object irradiated with light by a light source. The reading method includes individually setting a reading density range of the object in correction in a first reading operation for executing the correction using first reference data, for data of the object read in a visible light region, or a second reading operation for executing the correction using second reference data, for data of the object read in an invisible light region.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a flowchart schematically illustrating a flow of image reading processing;

Figure 1:
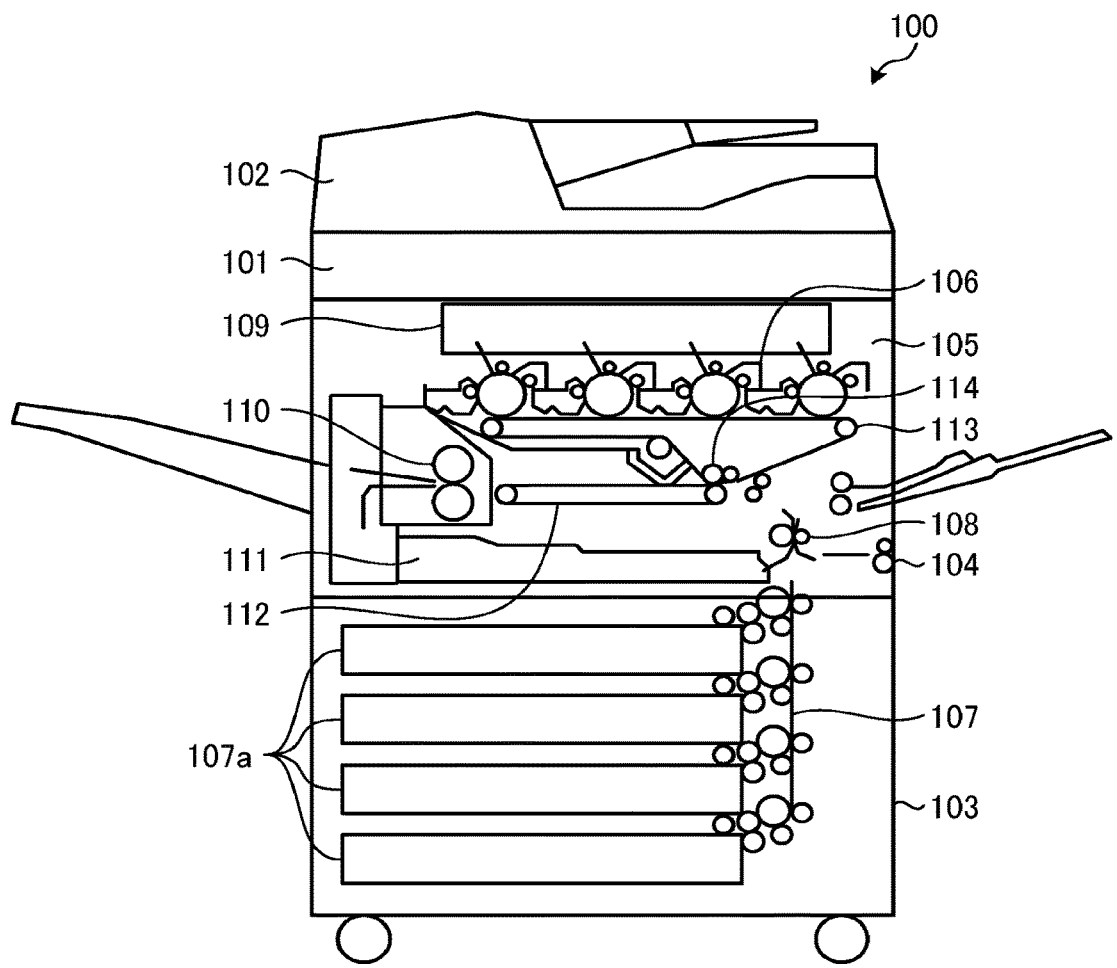
FIG. 1 is a schematic view of an exemplary configuration of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a reading device, an image forming apparatus, and a reading method will be described in detail with reference to the attached drawings.

First Embodiment

FIG. 1 is a diagram illustrating an exemplary configuration of an image forming apparatus 100 according to a first embodiment. In FIG. 1, the image forming apparatus 100 is a generally called multifunction peripheral having at least two of a copy function, a printer function, a scanner function, and a facsimile function.

The image forming apparatus 100 includes an image reader 101 that is a reading device and an automatic document feeder (ADF) 102, and an image forming device 103 under the image reader 101 and the ADF 102. With regard to the image forming device 103, an external cover is removed and an internal configuration is illustrated for describing the internal configuration.

The ADF 102 is a document support device that positions a document with an image to be read to a reading position. The ADF 102 automatically conveys the document placed on a placement table to the reading position. The image reader 101 reads the document conveyed by the ADF 102 at a predetermined reading position. Further, the image reader 101 has, on a top surface, a contact glass, that is the document support device on which a document is placed, and reads the document on the contact glass that is at the reading position. Specifically, the image reader 101 is a scanner including a light source, an optical system, and an image sensor such as a charge coupled device (CCD) inside, and reads reflected light of the document, which is illuminated by the light source, by the image sensor through the optical system.

The image forming device 103 includes a manual feed roller 104 for manually feeding a recording sheet, and a recording sheet supply unit 107 for supplying the recording sheet. The recording sheet supply unit 107 has a mechanism for sending out the recording sheet from a multistage recording sheet feeding cassette 107a. The supplied recording sheet is sent to a secondary transfer belt 112 via a registration roller 108.

A toner image on an intermediate transfer belt 113 is transferred in a transfer device 114 to the recording sheet conveyed on the secondary transfer belt 112.

Further, the image forming device 103 includes an optical writing device 109, a tandem image forming unit (Y, M, C, and K) 105, the intermediate transfer belt 113, the above-described secondary transfer belt 112, and the like. The image written by the optical writing device 109 is formed as a toner image on the intermediate transfer belt 113 by an image forming process by the image forming unit 105.

Specifically, the image forming unit (Y, M, C, and K) 105 includes four photoconductor drums (Y, M, C, and K) in a rotatable manner, and image forming elements 106 each including a charging roller, a developing device, a primary transfer roller, a cleaner unit, and a static eliminator around the respective photoconductor drums. The image forming element 106 functions on each photoconductor drum, and the image on the photoconductor drum is transferred onto the intermediate transfer belt 113 by each primary transfer roller.

The intermediate transfer belt 113 is disposed to be stretched by a drive roller and a driven roller at a nip between each photoconductor drum and each primary transfer roller. The toner image primarily transferred onto the intermediate transfer belt 113 is secondarily transferred onto the recording sheet on the secondary transfer belt 112 by a secondary transfer device as the intermediate transfer belt 113 travels. The recording sheet is conveyed to a fixing device 110 as the secondary transfer belt 112 travels, and the toner image is fixed as a color image on the recording sheet. Thereafter, the recording sheet is discharged to a sheet ejection tray outside the apparatus. In the case of double-sided printing, the front and back of the recording sheet is reversed by a reversing mechanism 111, and the reversed recording sheet is sent onto the secondary transfer belt 112.

The image forming device 103 is not limited to the one that forms an image by an electrophotographic method as described above, and may be one that forms an image by an inkjet method.

Next, the image reader 101 will be described.

Figure 2:
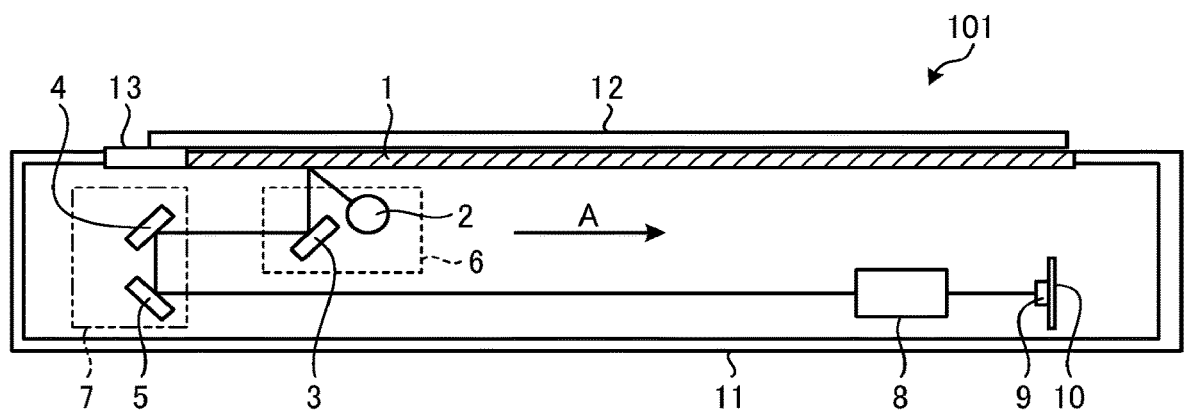
FIG. 2 is a cross-sectional view exemplarily illustrating a structure of an image reader.

FIG. 2 is a cross-sectional view exemplarily illustrating a structure of the image reader 101. As illustrated in FIG. 2, the image reader 101 includes a sensor substrate 10 provided with an image sensor 9 that is an imaging element, a lens unit 8, a first carriage 6, and a second carriage 7 in a main body 11. The image sensor 9 is, for example, a CCD or a CMOS image sensor. The first carriage 6 includes a light source 2 that is a light emitting diode (LED) and a mirror 3. The second carriage 7 has mirrors 4 and 5. Further, the image reader 101 is provided with the contact glass 1 and a reference white board 13 on a top surface.

The image reader 101 emits light upward from the light source 2 while moving the first carriage 6 and the second carriage 7 in a sub-scanning direction (A direction) from a standby position (home position) in a reading operation. Then, the first carriage 6 and the second carriage 7 form an image of reflected light from a document 12 on the image sensor 9 via the lens unit 8.

Further, the image reader 101 reads reflected light from the reference white board 13 and sets a reference when a power supply is turned on. That is, the image reader 101 moves the first carriage 6 right below the reference white board 13, turns on the light source 2 to form an image of the reflected light from the reference white board 13 on the image sensor 9, and performs gain adjustment.

Here, the light source 2 will be described in detail.

Figure 3:
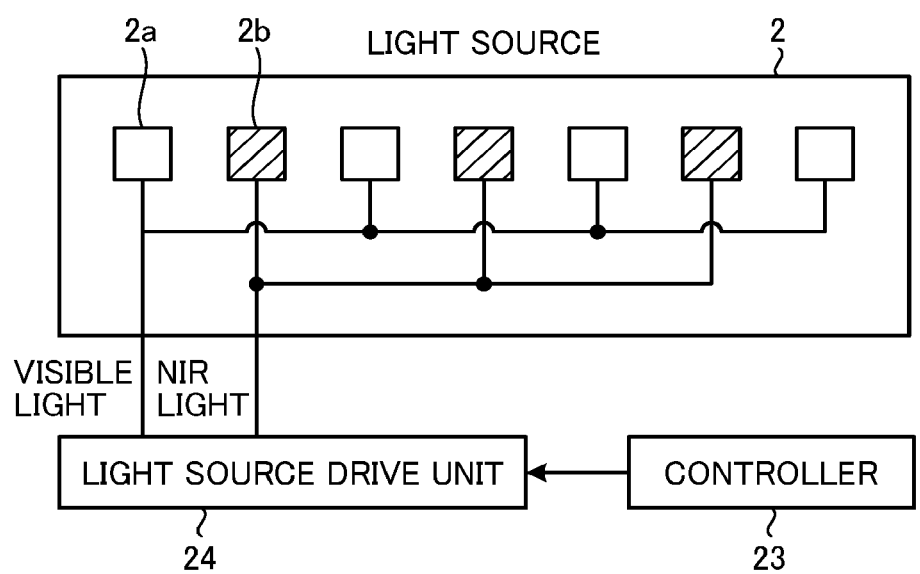
FIG. 3 is a diagram illustrating a configuration example of a light source.

FIG. 3 is a diagram illustrating a configuration example of the light source 2. As illustrated in FIG. 3, the light source 2 has a visible light source 2a (white) for reading a visible image (visible information) and a near infrared (NIR) invisible light source 2b for reading an invisible image (invisible information) alternately arranged in one light source.

Figure 4A:
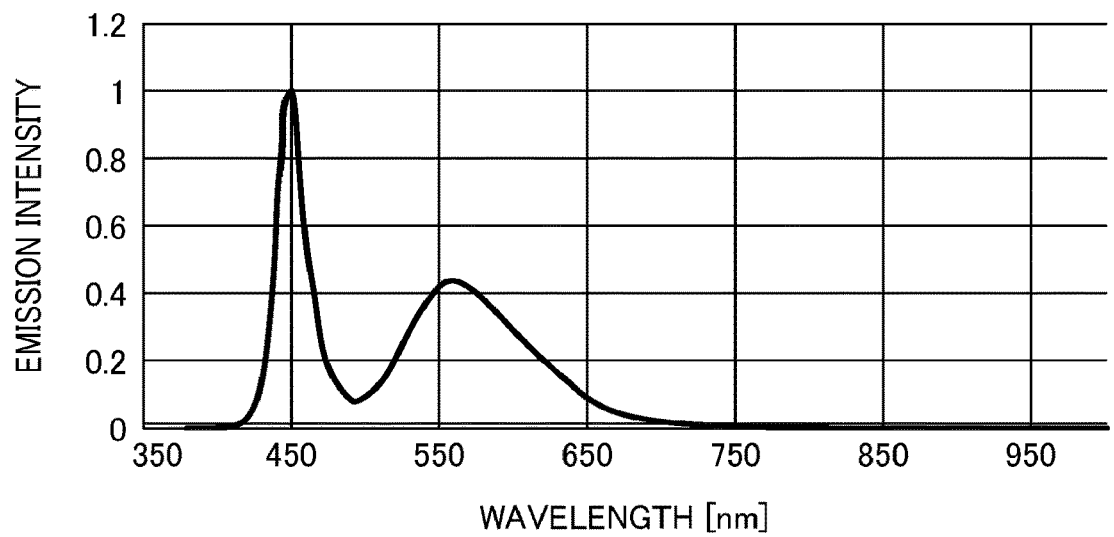
FIGS. 4A and 4B are diagrams illustrating spectra of light sources.
Figure 4B:
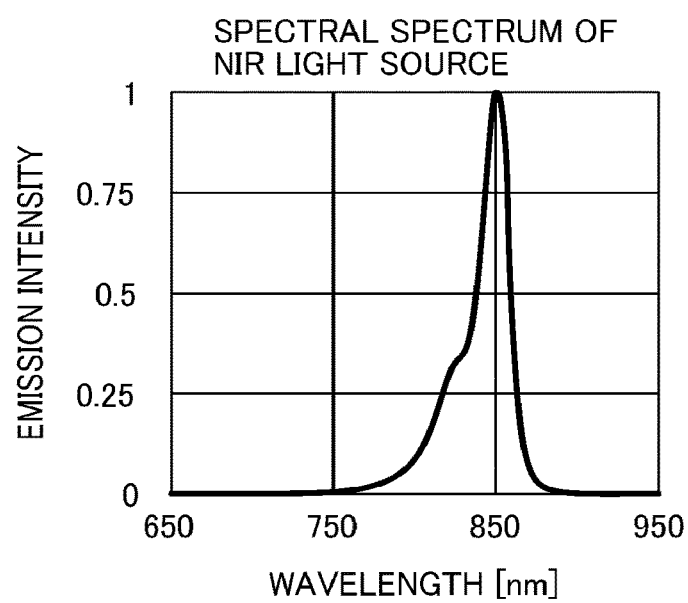

Here, FIGS. 4A and 4B are diagrams illustrating spectra of the light source 2. FIG. 4A illustrates a spectrum of the visible light source 2a, and FIG. 4B illustrates a spectrum of the invisible light source 2b (NIR). FIGS. 4A and 4B illustrates emission spectra of the visible light source 2a (white) in the case of an LED and the invisible light source 2b (NIR).

Note that, to read a visible or invisible image, it is sufficient to selectively read either image information in the end. Therefore, the present embodiment adopts a configuration to switch a light emission wavelength of the light source 2 between visible and invisible wavelengths although details will be described below. A light source drive unit 24 (see FIG. 6) switches the light source 2 according to control of a controller 23 (see FIG. 6).

As described above, by switching the light source 2 between the visible light source 2a (white) and the invisible light source 2b (NIR), reading of visible and invisible images can be implemented with a simple configuration.

Note that, in the present embodiment, an example in which the visible light source 2a (white) and the invisible light source 2b (NIR) are alternately arranged in one light source has been described. However, an embodiment is not limited to the example, and a two-light source configuration in which the visible light source 2a (white) and the invisible light source 2b (NW) are configured as separate light sources may be adopted. Further, even in the case of configuring the visible light source 2a (white) and the invisible light source 2b (NIR) in one light source, the arrangement is not limited to the example, and a configuration having the light sources arranged in a plurality of lines may be adopted as long as the configuration is capable of illuminating an object as the light source 2.

Next, the image sensor 9 will be described in detail.

Figure 5:
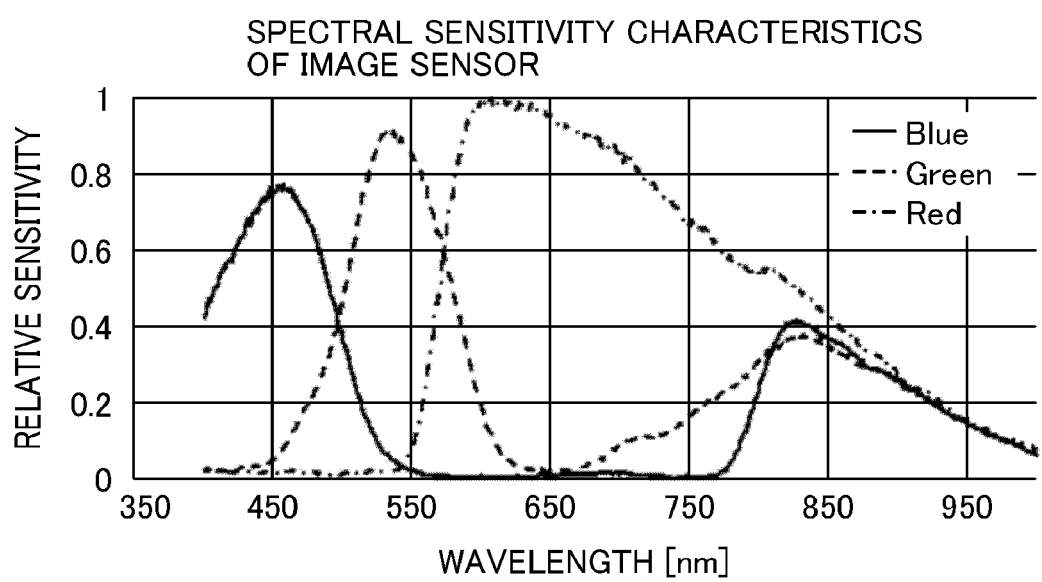
FIG. 5 is a diagram illustrating an example of spectral sensitivity characteristics of an Si-made image sensor.

The image sensor 9 of the present embodiment is a general silicon (Si)-made image sensor such as a CCD or a CMOS image sensor. Here, FIG. 5 is a diagram illustrating an example of spectral sensitivity characteristics of an Si-made image sensor. In general, in a near infrared (NW) region of from 800 to 1000 nm, pigment-based color filters exhibit high transmittance. Further, as can be seen from the spectral sensitivity characteristics of the Si-made image sensor illustrated in FIG. 5, Si itself has quantum sensitivity in the near infrared (NW) region of from 800 to 1000 nm. Therefore, by using a wavelength region of the near infrared (NW) region of from 800 to 1000 nm as an invisible light region, the sensor can be used in a highly sensitive state, and S/N of an invisible image can be increased. Therefore, the light use efficiency of the invisible image can be enhanced. That is, an apparatus for reading an invisible image with a simple configuration can be implemented.

Figure 6:
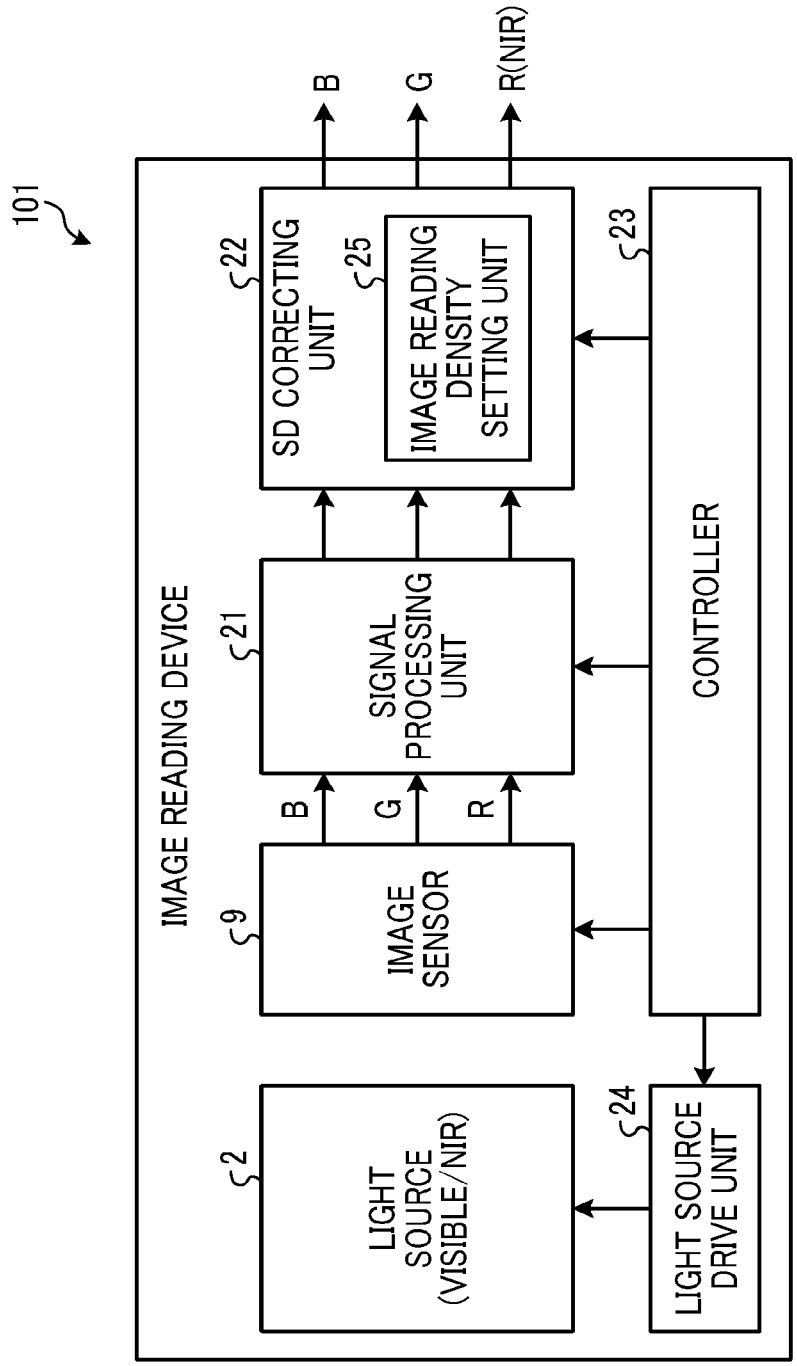
FIG. 6 is a block diagram illustrating electrical connection of each part constituting an image reader.

FIG. 6 is a block diagram illustrating electrical connection of each part constituting the image reader 101. As illustrated in FIG. 6, the image reader 101 includes a signal processing unit 21, a shading (SD) correction unit 22 that is a signal correction unit, the controller 23, and the light source drive unit 24, in addition to the image sensor 9 and the light source 2 described above.

As described above, the light source 2 is configured for visible and near infrared (NW) light sources. The light source drive unit 24 drives the light source 2.

The signal processing unit 21 includes a gain controller (amplifier), an offset controller, and an A/D converter. The signal processing unit 21 executes gain control, offset control, and A/D conversion for an image signal (RGB) output from the image sensor 9.

The controller 23 selectively controls a visible image mode and an NIR image mode, and controls settings of the light source drive unit 24, the image sensor 9, the signal processing unit 21, and the SD correction unit 22. The controller 23 functions as a reading controller that selectively controls a first reading operation and a second reading operation.

In the first reading operation, shading correction using first reference data is executed for data of an object read in the visible light region. In the second reading operation, shading correction using second reference data is executed for data of an object read in the invisible light region.

The SD correction unit 22 includes a line memory and executes the shading correction. The shading correction is to normalize a main scanning distribution such as sensitivity variation and unevenness of a light amount of the image sensor 9 for each pixel with the reference white board 13 to correct the main scanning distribution.

Here, conventional problems will be described in detail. Heretofore, it is known that optical characteristics are different between a visible light region (RGB) of wavelengths of about from 400 to 700 nm and a near infrared (NIR) region of wavelengths of about from 700 to 1000 nm. The optical characteristics between the visible light region and the NIR region differ depending on medium.

Figure 7:
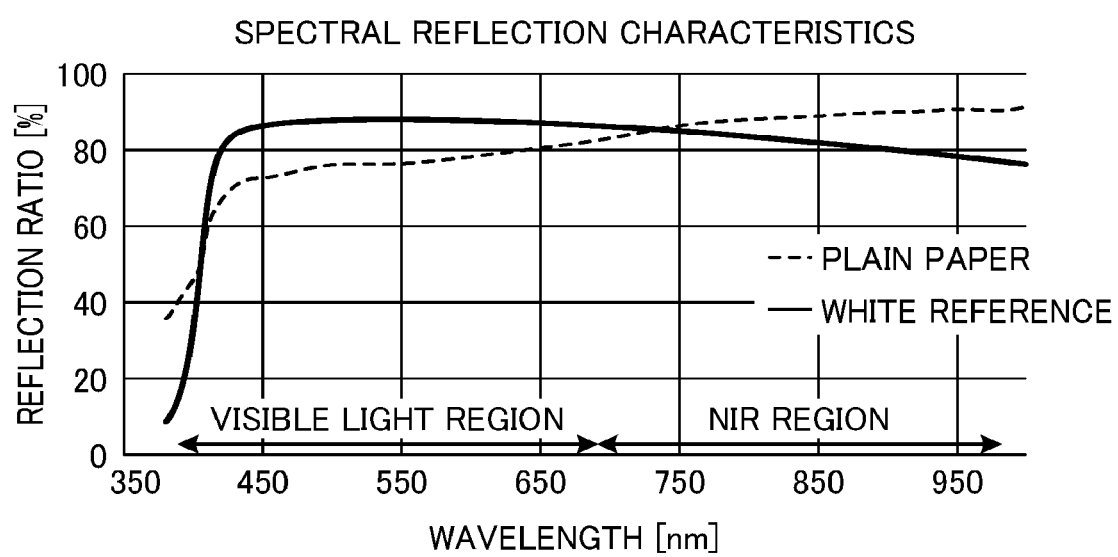
FIG. 7 is a diagram illustrating an example of spectral reflection characteristics.

Here, FIG. 7 is a diagram illustrating an example of spectral reflection characteristics. The example illustrated in FIG. 7 is an example of spectral reflection characteristics from the visible light region to the NIR region in a reference white board and a plain paper (white paper) that is an object. As illustrated in FIG. 7, the spectral reflectance of the reference white board (illustrated by the solid line in FIG. 7) gradually decreases in reflectance from the visible light region (RGB) to the NIR region. Meanwhile, the spectral reflectance of the plain paper (white paper) (illustrated by the dotted line in FIG. 7) increases in reflectance from the visible light region (RGB) to the NIR region, contrary to the reference white board. That is, the optical characteristics differ depending on the medium in such a manner that the reflectance decreases on the one hand, the reflectance increases on the other hand, in the visible light region (RGB) and in the NIR region.

In a conventional reading device, a correction operation of the following expression (1) is executed for each pixel.

Data after shading correction (N)=input data (N)/
shading data (N)*255   (1)

N: Pixel number

According to the conventional shading correction, the value becomes 255 or larger and the data is saturated in a case of reading an object having similar density to the reference white board. This indicates that the reading device cannot read an object brighter than or equal to the density of the reference white board.

Here, an example of reading plain paper (white paper) in the conventional visible light region will be examined. When the plain paper (white paper) is read, the data after shading correction becomes 255 or smaller. This is because the plain paper (white paper) is lower (darker) in reflectance than the reference white board when viewed in the visible light region, as can be understood from the spectral reflectance illustrated in FIG. 7. However, when the plain paper (white paper) is read in the NIR region (for example, around 850 nm), the data after shading correction exceeds 255 and the value is saturated. This is because the plain paper (white paper) is higher (brighter) in reflectance than the reference white board in the NIR region in the spectral reflectance illustrated in FIG. 7, contrary to the above case. In this case, the density of the plain paper (white paper) cannot be accurately read in the NIR region.

As describe above, the conventional reading device has a disadvantage that the read image density differs between the visible light region and the NIR region, and the read image density is limited in the NIR region as compared with the visible light region, due to the optical characteristic difference between the visible light region and the NIR region according to the medium.

Therefore, in the image reader 101, the SD correction unit 22 includes a reading density setting unit 25 that functions as a correction unit or a reading density setting unit. The reading density setting unit 25 has a function to vary the reading density after shading correction.

That is, the SD correction unit 22 executes a correction operation of the following expression (2) for each pixel.

Data after shading correction (N)=input data (N)/
shading data (N)*255*k   (2)

N: Pixel number k: Reading density variable coefficient (a coefficient of 1 or smaller)

In particular, the reading density variable coefficient k that is a coefficient of 1 or smaller is introduced into the expression (1) of the conventional shading correction operation, and the coefficient k is made variable between a visible image mode and an NIR image mode, so that a reading density range is made variable. With the configuration to vary the reading density at the time of shading correction as described above, limitation of the reading density range in the NIR region can be avoided.

Here, an example of reading plain paper (white paper) in the visible light region will be examined. In a case where k=1 set in the expression (2) in the visible image mode, and plain paper (the reflectance: 74% at 550 nm) is read, the data after shading correction normalized with the reference white board (the reflectance: 89% at 550 nm) becomes 0.74/0.89*255*1≈212.

Further, in a case where k=0.7 set in the expression (2) in the NIR image mode, and plain paper (the reflectance: 88% at 850 nm) is read, the data after shading correction normalized with the reference white board (the reflectance: 74% at 850 nm) becomes 0.88/0.74*255*0.7≈212.

Thus, saturation of a reading level, in other words, limitation of the reading density range can be suppressed.

As described above, in the present embodiment, varying the reading level of input data (object) with respect to shading data (reference object) is important, thereby making the reading density range variable and suppressing the saturation of the reading level. Therefore, a configuration to increase and decrease the reading levels of both the shading data and the input data in the same manner cannot obtain the effects of the present invention. Further, the reference object is the reference white board 13 in both the visible image mode and the NIR image mode, and the configuration is simplified by sharing the reference object. Thereby, the limitation of the reading density range of the invisible image can be suppressed with the simple configuration.

By setting the reading density variable coefficient k on the basis of the optical characteristic difference between the visible light region and the NIR region, the reading density ranges of the visible image mode and the NIR image mode can be appropriately made uniform. In other words, the reading density setting unit 25 functioning as the correction unit applies correction processing based on the optical characteristic difference from the visible light region to an image signal in the invisible light region output from the image sensor 9, and outputs the image signal. Thereby, the limitation of the reading density range can be appropriately suppressed.

In the present embodiment, the reading density variable coefficient k after shading correction has been used as means for setting the reading density range. However, an embodiment is not limited to the case. For example, the reading density range can be made variable by changing the gain of the gain controller between at the time of acquiring the shading data (at the time of reading the reference white board 13) and at the time of reading the object, or equivalently switching the gain by switching a dynamic range of the A/D converter.

Further, the reading density range of the NW region can be made equal to the reading density range of the visible light region (RGB) by adjusting the reading density range read in the NW region to become equal to the reading density range read in the visible light region.

Further, the reading density ranges can be adjusted with high accuracy by selecting the optical characteristics according to a reading method such as using the above-described spectral reflectance in a reading device of a reflection optical system and using spectral transmittance in a reading device of a transmission optical system. Thereby, the limitation of the reading density range can be suppressed with high accuracy.

Next, the SD correction unit 22 will be described in detail.

As illustrated in FIG. 5, since the image sensor 9 generally has sensitivity in the near infrared region (NIR), respective pixel arrays of RGB are indistinguishable from a perspective of the NIR region. Therefore, in the case of reading an NIR image, any of RGB pixel arrays may be used.

Meanwhile, for example, a conventional configuration premises simultaneously using a visible image and an invisible image although has the function to selectively read the visible image and the invisible image. Therefore, such a conventional configuration includes a configuration specific to the invisible image reading such as a line memory for NIR, which may cause a disadvantage of an increase in circuit size and cost in the case of reading an invisible image. However, in the case of performing invisible marking in a regular document and reading the marking to determine authenticity, the visible image and the invisible image do not need to be simultaneously acquired, and there are many cases where the invisible image alone is functionally sufficient.

Therefore, in the present embodiment, processing circuits for visible and invisible images are made common, and an increase in circuit size and cost is suppressed even in the case of reading the invisible image.

Figure 8B:
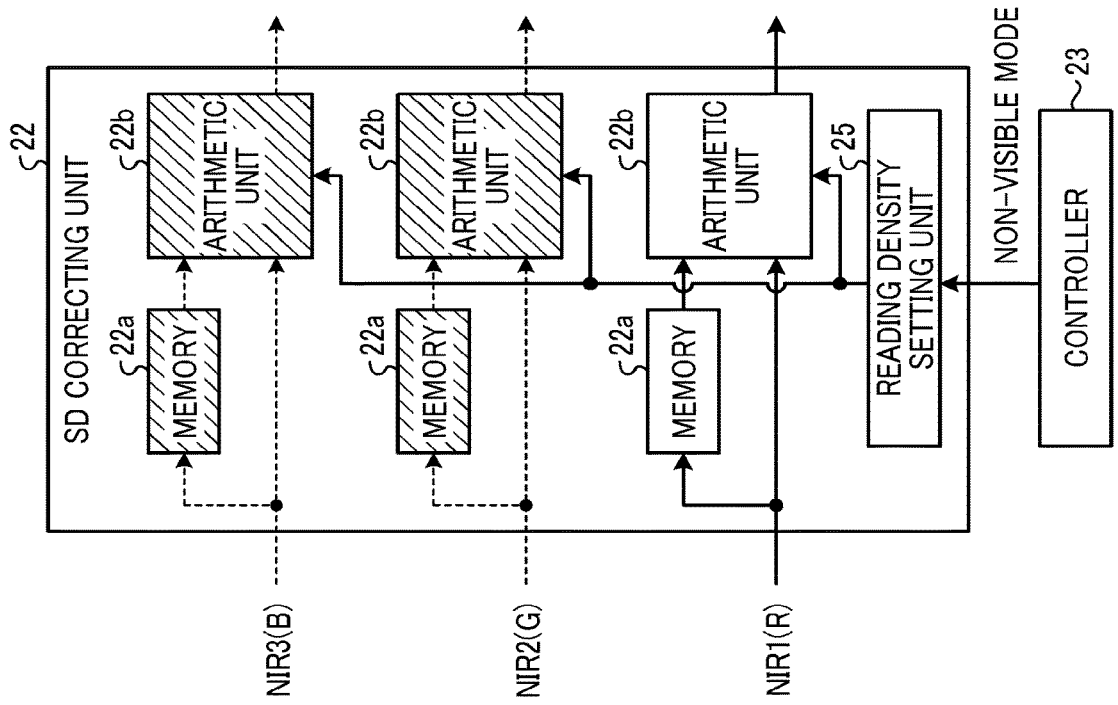
FIGS. 8A and 8B are diagrams illustrating processing lines in an SD correction unit.
Figure 8A:
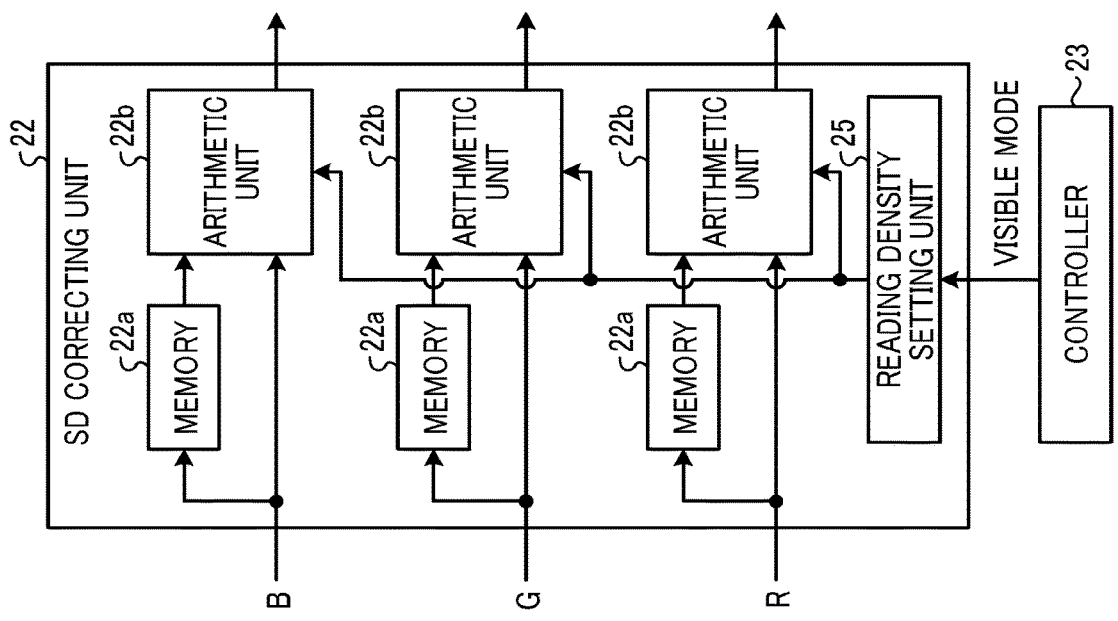

FIGS. 8A and 8B are diagrams illustrating processing lines in an SD correction unit 22. FIGS. 8A and 8B illustrate an example in which processing lines for the visible and invisible images are made common by taking shading correction as an example. FIG. 8A illustrates processing blocks for the visible image. As illustrated in FIG. 8A, input RGB data are connected to memories 22a and arithmetic units 22b, and read data of the reference white board 13 (shading data: first reference data and second reference data) are stored in the memories 22a. The arithmetic unit 22b corrects the input RGB data with the shading data. The arithmetic unit 22b executes an operation using the above-described expression (2).

Meanwhile, FIG. 8B illustrates processing blocks for the invisible image. As illustrated in FIG. 8B, a signal obtained from an R channel is used as an NIR signal (NIR1). NIR signals (NIR2 and NIR3) obtained from G and B channels are not used.

With the configuration, in the case of requiring either the visible image or the invisible image, the configuration specific to the invisible image is unwanted, and the processing circuit can be shared between the visible image and the invisible image. Note that the visible and invisible operations are switched by the controller 23. Thereby, the invisible image can be read without changing the configuration of subsequent processing.

Note that, in the present embodiment, the signal obtained from the R channel has been used as the NIR signal (NIR1). However, an embodiment is not limited to the example, and a signal obtained from the G channel or the B channel can be used as the NIR signal.

Further, in the present embodiment, the SD correction unit 22 has been described as an example. However, similar concept can be applied to any functional block processed for each processing line.

Furthermore, as illustrated in FIG. 8B, the power consumption can be reduced by stopping the operations of the functional blocks (the memory 22a and the arithmetic unit 22b) related to an unused processing line. The same applies to an image sensor 9 illustrated in FIG. 14 described below. Thereby, the power in reading the invisible image can be decreased.

Next, a flow of image reading processing by control of the controller 23 will be described.

FIG. 9 is a flowchart schematically illustrating a flow of image reading processing. As illustrated in FIG. 9, the controller 23 determines whether the visible image mode is designated (step S1).

In the case where the visible image mode is designated (Yes in step S1), the controller 23 proceeds to step S2. In step S2, the controller 23 executes mode switching of the image sensor 9 to set the "visible mode".

Next, the controller 23 executes mode switching of the signal processing unit 21 to set the "visible mode" (step S3), executes mode switching of the light source 2 to set the "visible mode" (step S4), and executes mode switching of the reading density variable coefficient (k) to set the "visible mode" (step S5).

Thereafter, in step S6, the controller 23 executes image reading. Here, implemented is the first reading operation in which correction using the first reference data is executed for data of the object read in the visible light region.

Meanwhile, in the case where the NIR image mode is designated (No in step S1), the controller 23 proceeds to step S7. In step S7, the controller 23 executes mode switching of the image sensor 9 to set the "NIR mode".

Next, the controller 23 executes the mode switching of the signal processing unit 21 to set the "NIR mode" (step S8), executes the mode switching of the light source 2 to set the "NW mode" (step S9), and executes the mode switching of the reading density variable coefficient (k) to set the "NIR mode" (step S10).

Thereafter, in step S6, the controller 23 executes the image reading. Here, implemented is the second reading operation in which correction using the second reference data is executed for data of the object read in the invisible light region.

That is, in the image reading processing of the present embodiment, the reading density variable coefficient k is controlled in each of the visible image mode and the NIR image mode.

Further, in the image reading processing of the present embodiment, the image sensor 9, the signal processing unit 21, and the light source 2 are changed to the settings of either the visible image mode or the NIR image mode.

The shading data is obtained by reading the reference white board in the image reading operation similarly to normal RGB reading. The reading density variable coefficient k is selected in the visible image mode or in the NIR image mode, and the respective reading density variable coefficients k are set such that the reading density ranges are made uniform in the visible image mode and the NIR image mode.

As described above, according to the present embodiment, by adjusting the reading density of the visible light region with the reading density of the invisible light region, limitation of the reading density range in the invisible light region with respect to the visible light region can be suppressed.

In the present embodiment, the NIR region has been described as an example of the invisible light region. However, similar effects can be exhibited in an ultraviolet light region and other wavelength regions.

Note that description has been made in the setting of k=1 in the visible image mode in FIG. 6. However, a value other than 1 may be set. Further, a smaller value has been set in the NIR image mode than k in the visible image mode. However, in a case where the reading density range becomes wider in the NIR image mode than the visible image mode, the magnitude relationship in k between the visible image mode and the NIR image mode is reversed. Even in such a case, the effects of the present invention are similarly exhibited.

Second Embodiment

Next, a second embodiment will be described.

The first embodiment has adopted the configuration to switch the light emission wavelength of the light source 2 to switch the visible reading and invisible reading. The second embodiment is different from the first embodiment in having a configuration having an optical filter inserted and to switch a transmission wavelength between visible reading and invisible reading. Hereinafter, in the description of the second embodiment, description of the same part as the first embodiment is omitted and different parts from the first embodiment will be described.

Figure 10:
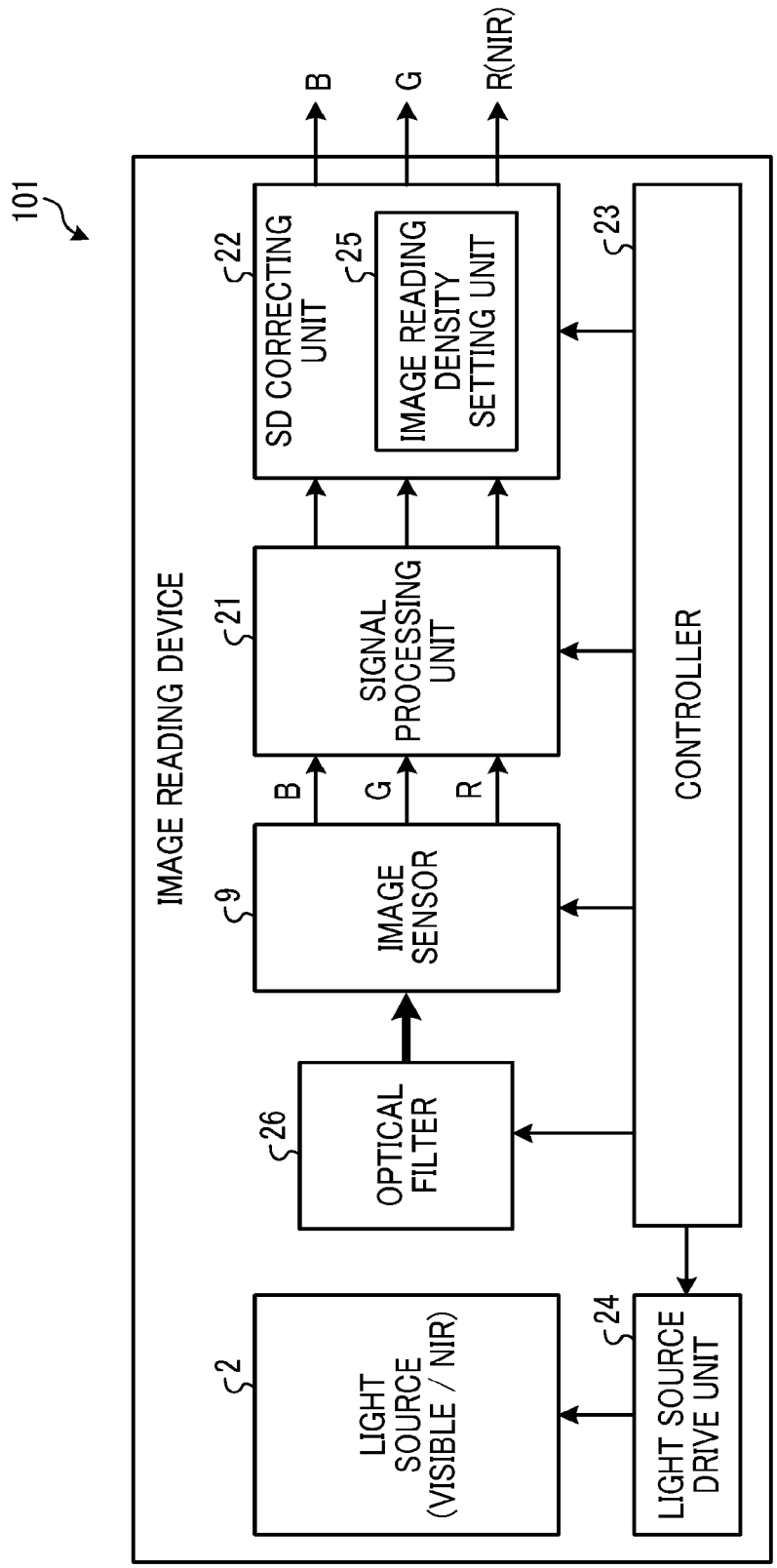
FIG. 10 is a block diagram illustrating electrical connection of each part constituting an image reader according to a second embodiment.

FIG. 10 is a block diagram illustrating electrical connection of each part constituting an image reader 101 according to the second embodiment. As illustrated in FIG. 10, the image reader 101 further includes an optical filter 26 at a preceding stage of an image sensor 9. The optical filter 26 can change a transmission wavelength. That is, the image reader 101 according to the second embodiment changes the transmission wavelength of the optical filter 26 to perform invisible reading. Meanwhile, in the image reader 101 according to the second embodiment, switching drive of a visible light source 2a (white) and an invisible light source 2b (NIR) by a light source drive unit 24 is not required. The light source drive unit 24 simultaneously drives the visible light source 2a (white) and the invisible light source 2b (NIR).

Figure 11A:
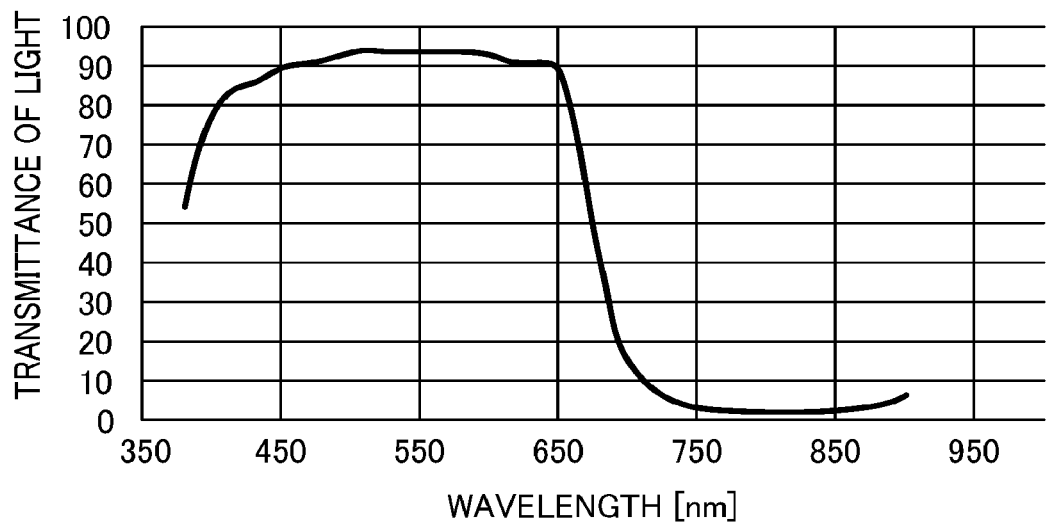
FIGS. 11A and 11B are diagrams illustrating transmission spectra of optical filters.
Figure 11B:
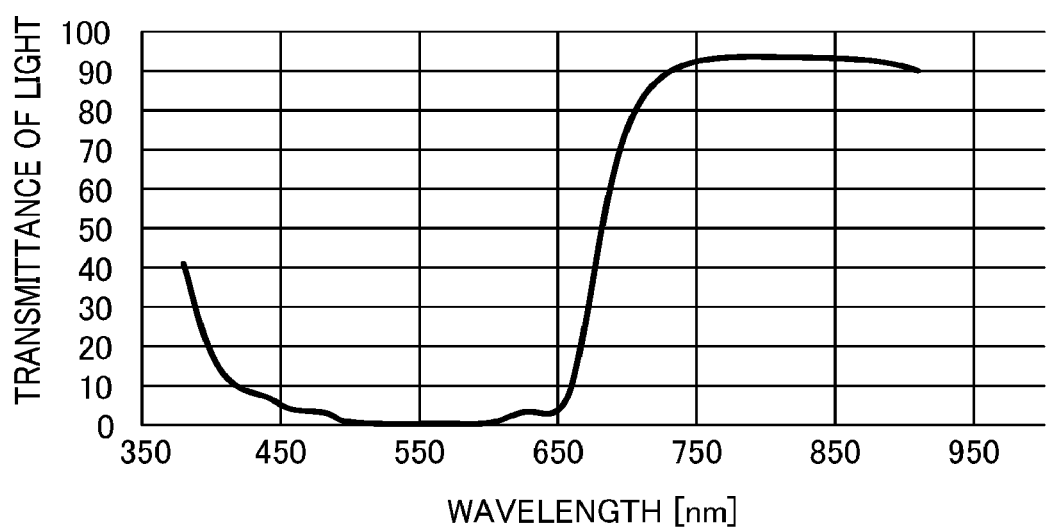

Here, FIGS. 11A and 11B are diagrams illustrating transmission spectra of the optical filters 26. FIG. 11A is a diagram illustrating a transmission spectrum of a visible transmission filter, and FIG. 11B is a diagram illustrating a transmission spectrum of an invisible (NIR) transmission filter. The optical filter 26 includes the plurality of optical filters 26 having the transmission characteristics illustrated in FIGS. 11A and 11B. The switching of the transmission characteristics is performed by mechanically switching the plurality of optical filters 26 according to control of a controller 23. Thereby, reading of a visible image and an invisible image can be switched while suppressing the influence of color mixture.

In the present embodiment, the transmission wavelength of the optical filter 26 has been changed by mechanically switching the plurality of optical filters 26 having different transmission characteristics. However, an embodiment is not limited to the case. For example, the transmission characteristics may be electrically switched using an optical filter 26 having both the transmission characteristics such as an organic optical thin film.

As described above, according to the present embodiment, by switching the transmission characteristics of the optical filter 26, the visible image reading and the invisible image reading can be switched with a configuration with suppressed heat generation of the light source drive unit 24.

Further, even in the case of switching the transmission characteristics of the optical filter 26, a visible or invisible wavelength has already been selected at the time of incidence of light on the image sensor 9 and the image sensor 9 has sensitivity in the invisible (NIR) region as described above. Therefore, at least one pixel array of a general RGB image sensor can be used. Therefore, a special sensor does not need to be used and a cost increase can be suppressed.

Note that the optical filter 26 has been exemplarily illustrated in FIG. 10. However, any element other than the optical filter 26 may be used as long as the element has a transparent wavelength selectivity, and the transmission characteristics of a condenser lens (not illustrated) that guides light to the image sensor 9 may be switched.

Third Embodiment

Next, a third embodiment will be described.

The third embodiment is different from the first and second embodiment in having a configuration to switch spectral sensitivity (transmission wavelength) of an image sensor 9 between visible reading and invisible reading. Hereinafter, in the description of the third embodiment, description of the same part as the first and second embodiments is omitted and different parts from the first and second embodiments will be described.

Figure 12:
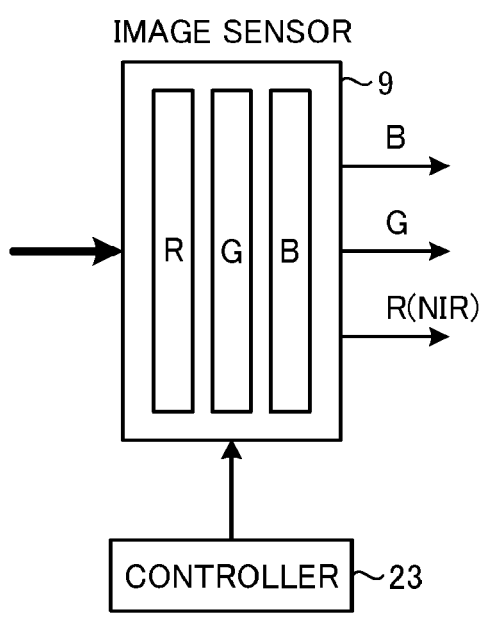
FIG. 12 is a block diagram illustrating electrical connection of each part constituting an image reader according to a third embodiment.

FIG. 12 is a block diagram illustrating electrical connection of each part constituting an image reader 101 according to the third embodiment. As illustrated in FIG. 12, the image sensor 9 of the image reader 101 has three lines of R, G, and B. The image sensor 9 is capable of changing the spectral sensitivity (transmission wavelength). That is, the image reader 101 according to the third embodiment changes the spectral sensitivity (transmission wavelength) of the image sensor 9 and reads an invisible image. Meanwhile, in the image reader 101 according to the third embodiment, switching drive of a visible light source 2a (white) and an invisible light source 2b (NIR) by a light source drive unit 24 is not required. The light source drive unit 24 simultaneously drives the visible light source 2a (white) and the invisible light source 2b (NIR).

Figure 13A:
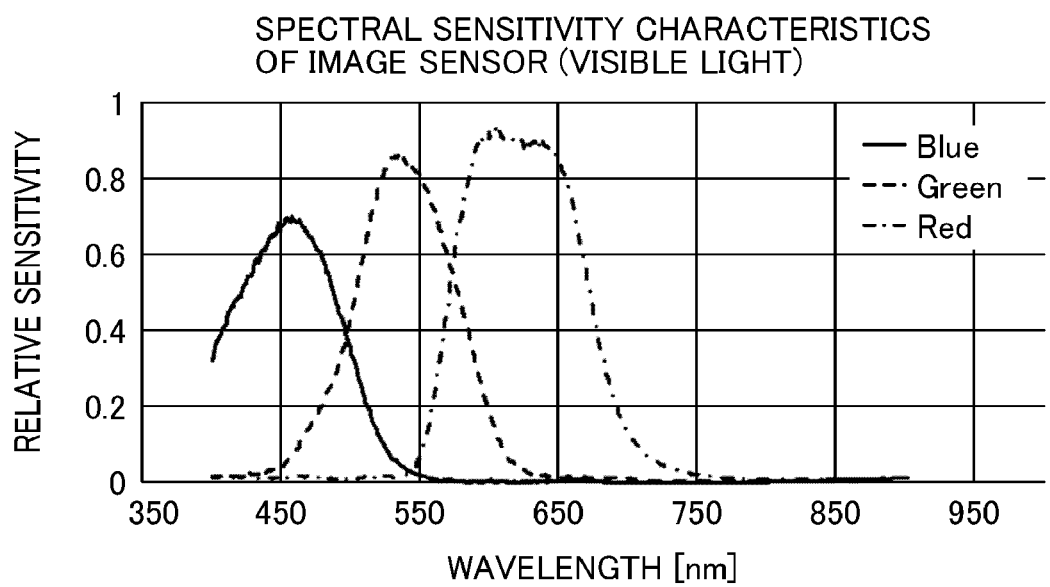
FIGS. 13A and 13B are diagrams illustrating spectral sensitivity spectra of an image sensor.
Figure 13B:
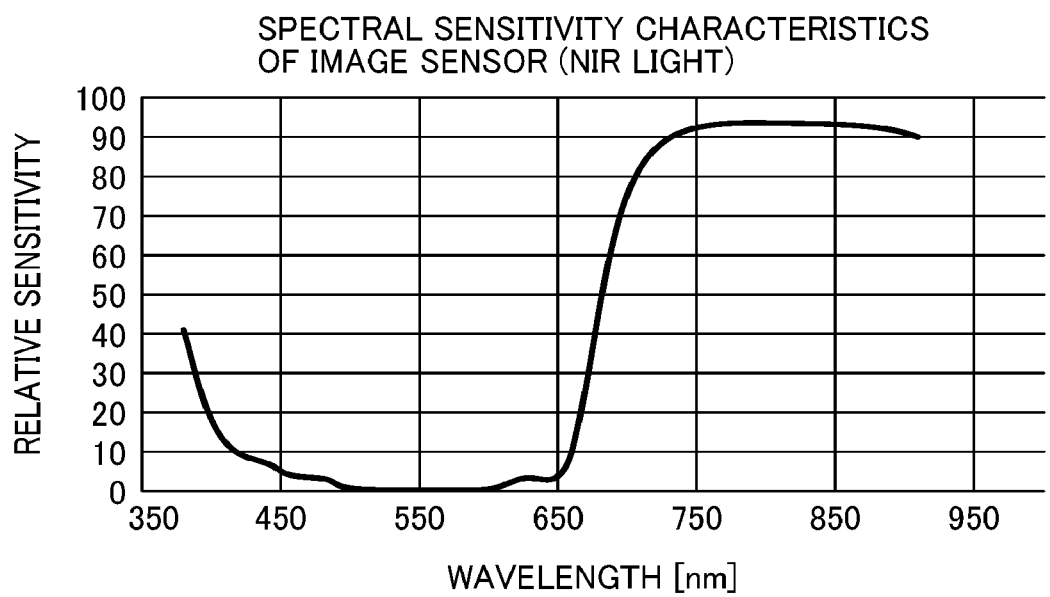

Here, FIGS. 13A and 13B are diagrams illustrating spectral sensitivity spectra of the image sensor 9. FIG. 13A is a diagram illustrating a visible spectral sensitivity spectrum of the image sensor 9, and FIG. 13B is a diagram illustrating an invisible (NIR) spectral sensitivity spectrum of the image sensor 9. The switching of the spectral sensitivity (transmission wavelength) is performed by electrically switching the transmission wavelength according to the control of the controller 23. More particularly, the image sensor 9 electrically switches transmission characteristics using a material having both characteristics, such as an organic optical thin film, as a color filter. In the present embodiment, the image sensor 9 switches the spectral sensitivity of an R pixel array.

Figure 14:
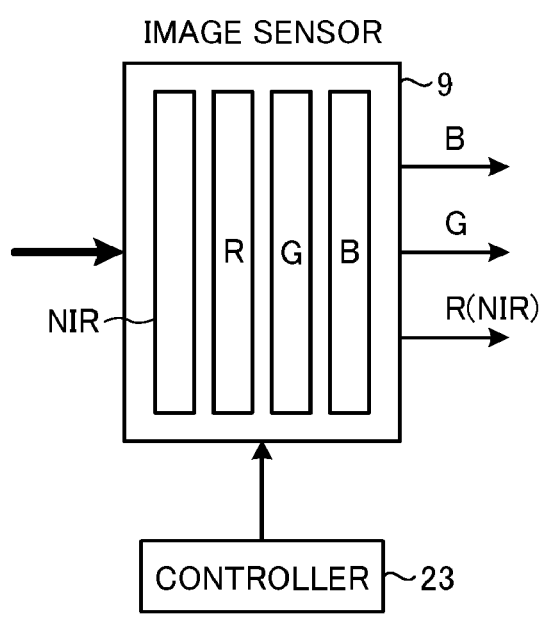
FIG. 14 is a diagram illustrating a modification of the image sensor of the image reader.

FIG. 14 is a diagram illustrating a modification of the image sensor 9 of the image reader 101. The image sensor 9 illustrated in FIG. 14 has an invisible (NIR) pixel array added in advance as the fourth line, and selectively outputs an NIR image signal inside the image sensor 9. That is, the image sensor 9 illustrated in FIG. 14 has four lines of R, G, B, and NIR. In the example illustrated in FIG. 14, the NIR image signal is output as R output. That is, the NIR image signal is output using a pixel array NIR having a different transmission characteristic from the R, G, and B pixel arrays of the image sensor 9. The switching of the spectral sensitivity (transmission wavelength) is performed by electrically switching the transmission wavelength according to the control of the controller 23. Thereby, the reading of the visible image and invisible image can be switched while suppressing the configuration size.

In the case of using the image sensor 9 illustrated in FIG. 14, the resolutions of the RGB pixel arrays and the resolution of the invisible (NIR) pixel array are made the same, whereby image deterioration in the invisible image with respect to the visible image can be suppressed. In the case of using a conventional RGB image sensor or the image sensor 9 illustrated in FIG. 12, the resolutions (main scanning) of the visible image and the invisible image become inevitably the same. Thereby, the resolution reduction of the invisible image can be suppressed.

According to the present embodiment, an increase in device size at the time of reading visible and invisible images can be suppressed by switching the spectral sensitivity (transmission wavelength) of the image sensor 9 without adding a mechanical mechanism or the like.

In FIGS. 12 and 14, an example of incorporating the function to selectively allocate the NIR image signal to the R output in the image sensor 9 has been described. However, the output of the NIR image signal can be performed in any color. Alternatively, the NIR image signal may be independently output.

Fourth Embodiment

In the first embodiment, an example of using the signal obtained from the R channel as the NIR signal (NIR1) in the SD correction unit 22 has been described. The fourth embodiment is different from the first to third embodiment in which all of processing lines used in visible and invisible images are made common in an SD correction unit 22. Hereinafter, in the description of the fourth embodiment, description of the same part as the first to third embodiments is omitted and different parts from the first to third embodiments will be described.

Figure 15:
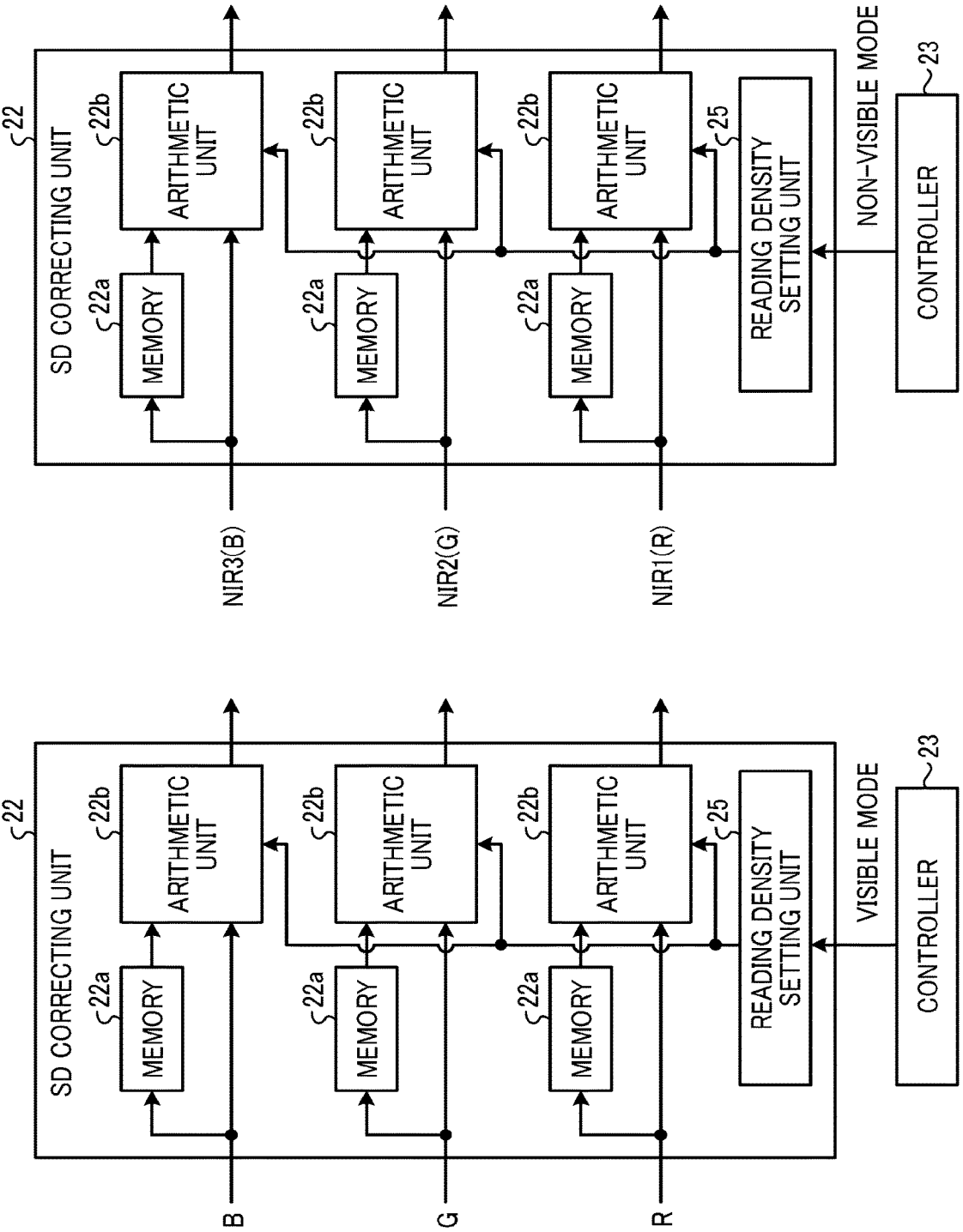
FIGS. 15A and 15B are diagrams illustrating processing lines in an SD correction unit according to a fourth embodiment.

FIGS. 15A and 15B are diagrams illustrating processing lines in the SD correction unit 22 according to the fourth embodiment. FIG. 15B illustrates a case of an NIR image mode. As illustrated in FIG. 15B, in the case of the NIR image mode, the SD correction unit 22 uses NIR signals obtained from all of color channels used in a visible image including not only an NIR signal (NIR1) obtained from an R channel but also an NIR signal (NIR2) obtained from a G channel and an NIR signal (NIR3) obtained from a B channel. Therefore, since the processing line used in a visible image mode and the NIR image mode is the same, operation switching of blocks is not required.

Meanwhile, FIG. 15A illustrates a case of the visible image mode. In the case of the visible image mode, a reading density setting unit 25 of the SD correction unit 22 can be used for gray balance adjustment to make RGB output values uniform. However, in the case of the visible image mode, the RGB output balances are different and thus a value set in the reading density setting unit 25 differs for each of RGB outputs. Therefore, in the case of the invisible image mode illustrated in FIG. 15B, an invisible image is output as a colored image (chromatic image) if the settings of the reading density setting unit 25 of the visible image mode are set.

Therefore, in the present embodiment, by setting reading density to make the output values uniform in all the processing lines used for the invisible image, the invisible image can be expressed as an achromatic image with no sense of discomfort.

Note that since NIR1 to NIR3 have no concept of color and have almost the same spectral characteristics, reading density settings in this case have almost the same values in principle.

As described above, according to the present embodiment, the settings of subsequent processing in the invisible image reading can be simplified and coloring of the invisible image can be suppressed.

Fifth Embodiment

A fifth embodiment is different from the first to fourth embodiment in performing monochrome processing for invisible image data. Hereinafter, in the description of the fifth embodiment, description of the same part as the first to fourth embodiments is omitted and different parts from the first to fourth embodiments will be described.

Figure 16:
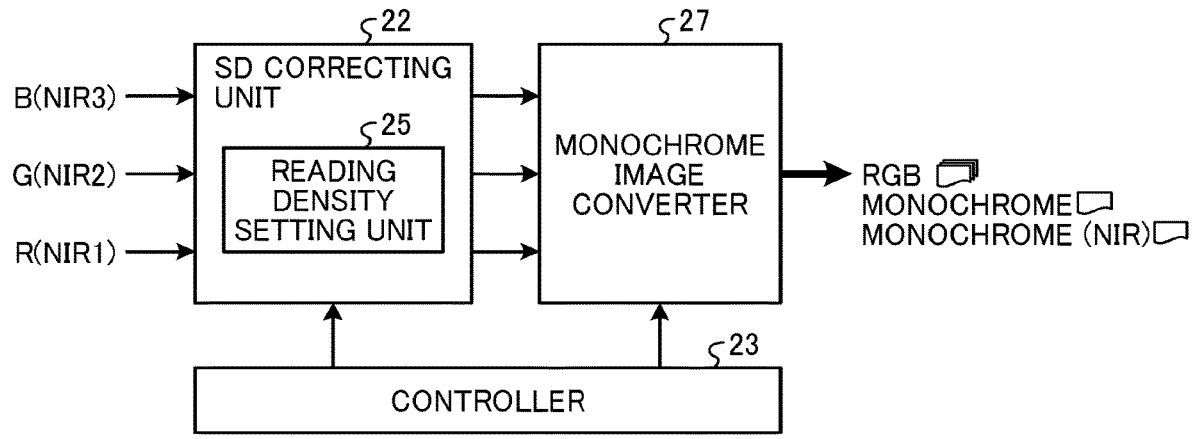
FIG. 16 is a block diagram illustrating electrical connection of each part constituting an image reader according to a fifth embodiment.

FIG. 16 is a block diagram illustrating electrical connection of each part constituting an image reader 101 according to the fifth embodiment. As illustrated in FIG. 16, the image reader 101 further includes a monochrome converter 27 at a subsequent stage of an SD correction unit 22. The monochrome converter 27 performs monochrome processing for converting input RGB image data into RGB, monochrome, and monochrome (NIR) image data. Here, an RGB image is in a state where monochrome conversion is not performed, and the monochrome indicates monochrome conversion for a visible image. The monochrome (NIR) indicates monochrome conversion for an NIR image. Thereby, a data size of an invisible image can be minimized.

Figure 17:
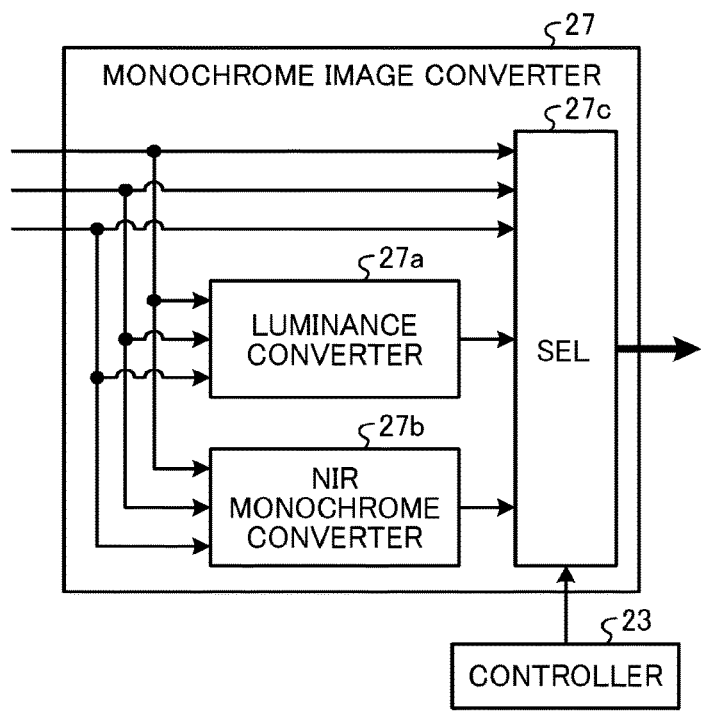
FIG. 17 is a diagram illustrating a configuration of a monochrome converter.

FIG. 17 is a diagram illustrating a configuration of the monochrome converter 27. As illustrated in FIG. 17, the monochrome converter 27 includes a luminance converter 27a, an NIR monochrome converter 27b, and a selector 27c. The monochrome converter 27 performs conversion according to each of RGB, monochrome, and monochrome (NIR) modes.

The luminance converter 27a performs monochrome conversion for a visible image, and performs luminance conversion for converting the visible image into luminance information.

The NIR monochrome converter 27b performs monochrome conversion for an NIR image. In the case of the monochrome conversion for an NIR image, there is no concept of luminance (the luminance is a characteristic defined for visible light). Therefore, the monochrome conversion for an NIR image is different from the conversion of the visible image. The NIR monochrome converter 27b, for example, averages the RGB input data or combines RGB input data at an arbitrary ratio to produce monochrome data and performs monochrome conversion.

The selector 27c outputs any of RGB, monochrome, and monochrome (NIR) data according to the control of a controller 23.

Next, a flow of image reading processing by control of the controller 23 will be described.

Figure 18:
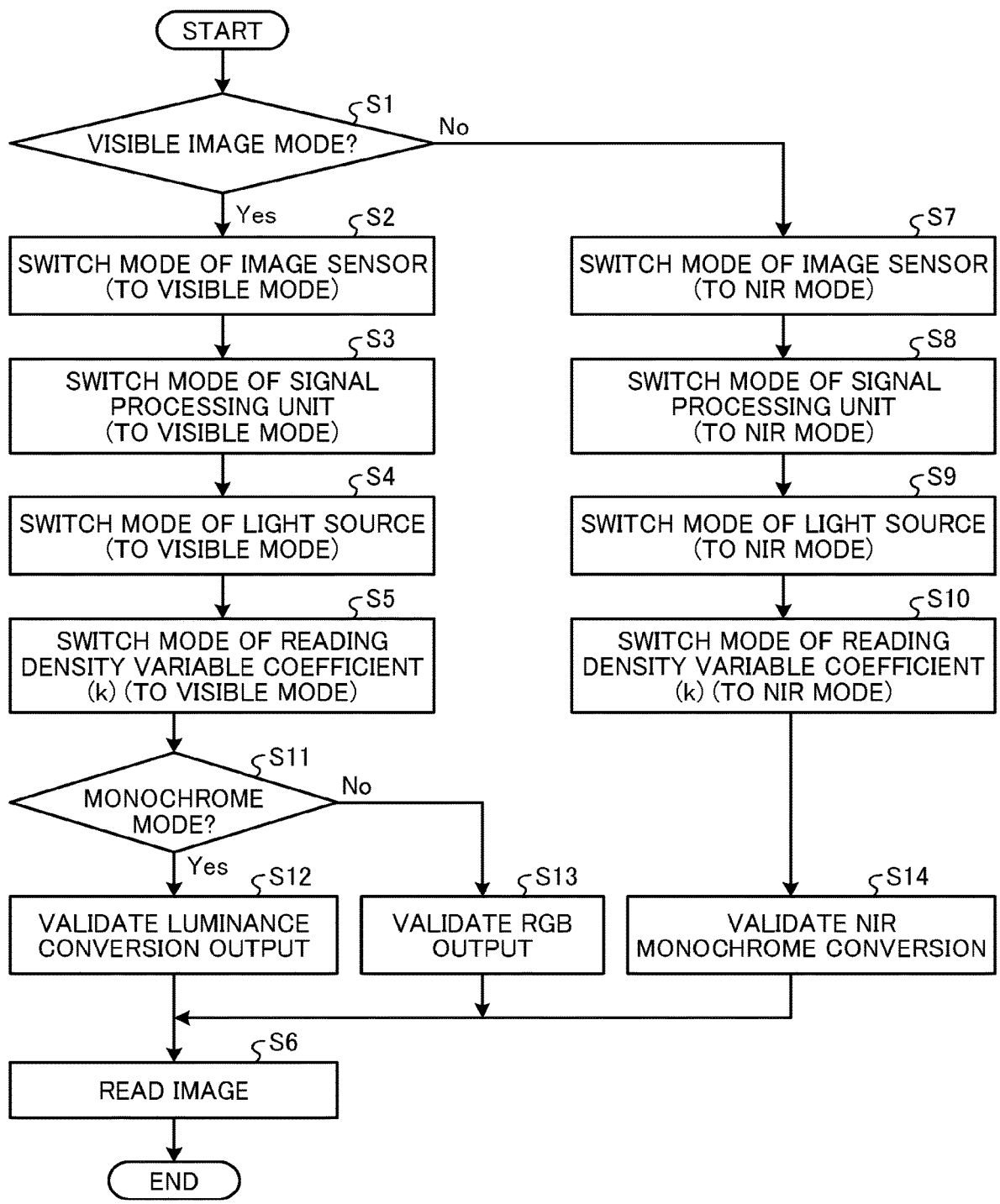
FIG. 18 is a flowchart schematically illustrating a flow of image reading processing.

FIG. 18 is a flowchart schematically illustrating a flow of image reading processing. Note that processing in steps S1 to S10 is not changed from the processing described in FIG. 9, and thus description of the processing is omitted.

When the controller 23 executes mode switching of the reading density variable coefficient (k) to set the "NIR mode" (step S5), the controller 23 proceeds to step S11.

In step S11, the controller 23 determines whether a monochrome mode is designated in the case of a visible image mode. In the case where the monochrome mode is designated (Yes in step S11), the controller 23 proceeds to step S12. In step S12, the controller 23 validates an output of the monochrome data for which the luminance conversion has been performed by the luminance converter 27a of the monochrome converter 27, and the controller 23 proceeds to step S6.

In the case where the monochrome mode is not designated (No in step S11), the controller 23 proceeds to step S13. In step S13, the controller 23 validates the RGB output and proceeds to step S6.

Meanwhile, when the controller 23 executes the mode switching of the reading density variable coefficient (k) to set the "NIR mode" (step S10), the controller 23 proceeds to step S14.

In step S14, the controller 23 validates an output of the monochrome data for which the NIR-monochrome conversion has been performed by the NIR monochrome converter 27b of the monochrome converter 27 in the case of the NIR image mode, and proceeds to step S6.

In the present embodiment, selection as to whether the monochrome mode is designated is not provided in the case of the NIR image mode. However, a configuration in which the selection may be provided to switch validity/invalidity of the monochrome conversion may be adopted.

As described above, according to the present embodiment, by converting the invisible image into the monochrome image data, an image file size can be minimized without a sense of discomfort for a user.

Sixth Embodiment

In the fifth embodiment, an example of performing the monochrome processing for the invisible image data has been described. A sixth embodiment is different from the first to fifth embodiments in making monochrome processing for a visible image and for an invisible image common. Hereinafter, in the description of the sixth embodiment, description of the same part as the first to fifth embodiments is omitted and different parts from the first to fifth embodiments will be described.

Figure 19:
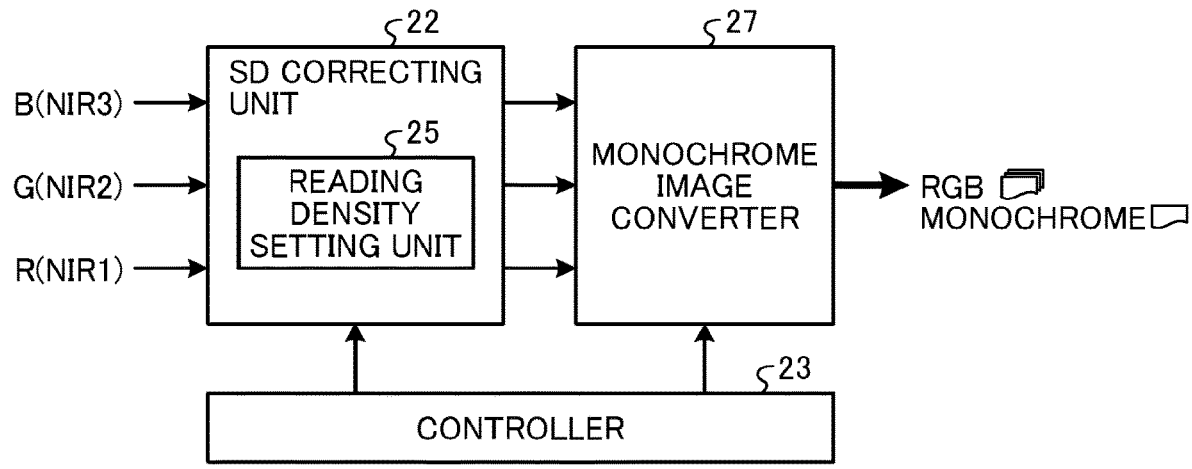
FIG. 19 is a block diagram illustrating electrical connection of each part constituting an image reader according to a sixth embodiment.

FIG. 19 is a block diagram illustrating electrical connection of each part constituting an image reader 101 according to the sixth embodiment. As illustrated in FIG. 19, the image reader 101 further includes a monochrome converter 27 at a subsequent stage of an SD correction unit 22. The monochrome converter 27 converts input RGB image data into RGB and monochrome image data. Here, an RGB image is in a state where monochrome conversion is not performed, and the monochrome indicates monochrome conversion for a visible image. That is, the monochrome converter 27 performs the same processing for monochrome conversion for a visible image and for monochrome conversion for an invisible image, and outputs data without distinction. Thereby, a data size of the invisible image can be minimized, and settings of subsequent processing can be simplified.

Figure 20:
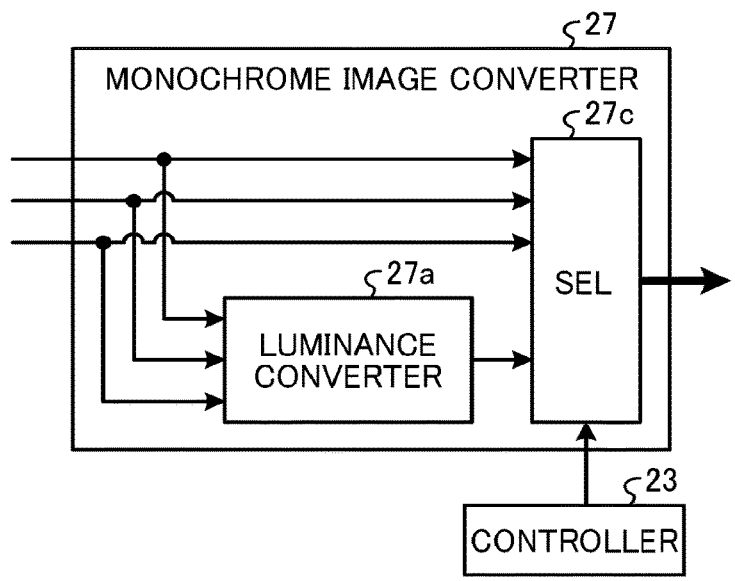
FIG. 20 is a diagram illustrating a configuration of a monochrome converter.

FIG. 20 is a diagram illustrating a configuration of the monochrome converter 27. As illustrated in FIG. 20, the monochrome converter 27 includes a luminance converter 27a and a selector 27c. The monochrome converter 27 performs conversion according to each of RGB and monochrome modes.

The luminance converter 27a performs monochrome conversion for the visible image and the invisible image, and performs luminance conversion for converting the visible image and the invisible image into luminance information. More particularly, the luminance conversion is obtained by combining RGB at an arbitrary ratio, for example, as in the following expression (3).

$$A \text{ luminance value} = (R*2+G*7+B*1)/10 \quad (3)$$

Although there is no meaning as a luminance value in the NIR signal in which RGB image data become equal, there is no problem even if the luminance conversion is performed, and thus the processing is made common for the visible image and for invisible image and the monochrome conversion can be performed. As a result, the monochrome conversion processing for the visible image and for the invisible image can be made common, and the processing can be simplified.

Next, a flow of image reading processing by control of the controller 23 will be described.

Figure 21:
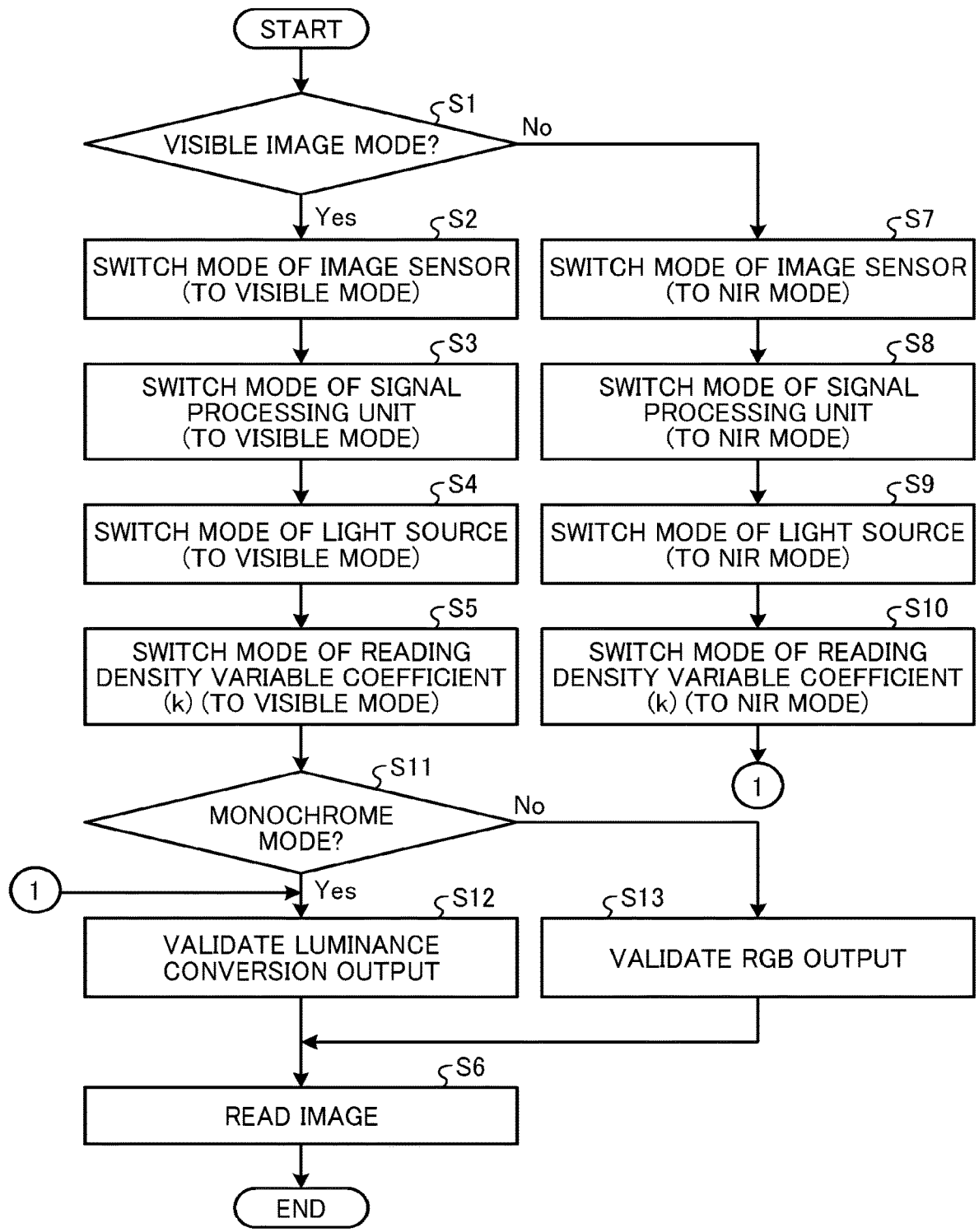
FIG. 21 is a flowchart schematically illustrating a flow of image reading processing.

FIG. 21 is a flowchart schematically illustrating a flow of image reading processing. Note that processing in steps S1 to S10 is not changed from the processing described in FIG. 9, and thus description of the processing is omitted.

When the controller 23 executes mode switching of the reading density variable coefficient (k) to set the "NIR mode" (step S5), the controller 23 proceeds to step S11.

In step S11, the controller 23 determines whether a monochrome mode is designated in the case of a visible image mode. In the case where the monochrome mode is designated (Yes in step S11), the controller 23 proceeds to step S12. In step S12, the controller 23 validates an output of the monochrome data for which the luminance conversion has been performed by the luminance converter 27a of the monochrome converter 27, and the controller 23 proceeds to step S6.

In the case where the monochrome mode is not designated (No in step S11), the controller 23 proceeds to step S13. In step S13, the controller 23 validates the RGB output and proceeds to step S6.

Meanwhile, when the controller 23 executes the mode switching of the reading density variable coefficient (k) to set the "NIR mode" (step S10), the controller 23 proceeds to step S12. In step S12, the controller 23 validates an output of the monochrome data for which the same luminance conversion as the visible image has been performed by the luminance converter 27a of the monochrome converter 27, and the controller 23 proceeds to step S6.

In the present embodiment, selection as to whether the monochrome mode is designated is not provided in the case of the NW image mode. However, a configuration in which the selection may be provided to switch validity/invalidity of the monochrome conversion may be adopted.

As described above, according to the present embodiment, by making the monochrome processing for the visible image and for the invisible image common, the processing related to the monochrome conversion can be simplified.

Seventh Embodiment

A seventh embodiment is different from the first to sixth embodiments in adding or averaging signals of pixel arrays using equivalence of RGB pixel arrays. Hereinafter, in the description of the seventh embodiment, description of the same part as the first to sixth embodiments is omitted and different parts from the first to sixth embodiments will be described.

Figure 22:
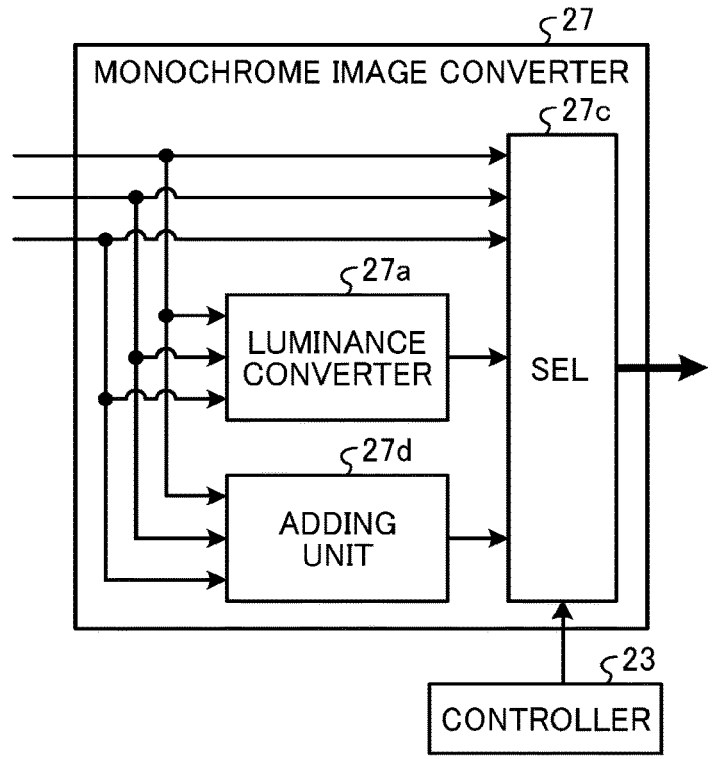
FIG. 22 is a diagram illustrating a configuration of a monochrome converter according to a seventh embodiment.

FIG. 22 is a diagram illustrating a configuration of a monochrome converter 27 according to the seventh embodiment. As illustrated in FIG. 22, the monochrome converter 27 includes a luminance converter 27a, an adder 27d, and a selector 27c. The monochrome converter 27 performs conversion according to each of RGB, monochrome, and monochrome (NIR) modes.

The luminance converter 27a performs monochrome conversion for a visible image, and performs luminance conversion for converting the visible image into luminance information.

The adder 27d adds signals obtained from RGB and performs monochrome conversion by adding at the same time in a case of an invisible (NIR) reading mode. Thereby, S/N of the invisible image can be increased.

Since a conventional RGB image sensor generally has sensitivity in a near infrared region (NIR), respective pixel arrays of RGB are indistinguishable from a perspective of the NIR region. Therefore, in essence, the RGB pixel arrays have no color distinction in the case of reading an NIR image, and it can be considered that the RGB pixel arrays have equivalent image information. Therefore, in the present embodiment, by adding signals of the RGB pixel arrays using the equivalence of the RGB pixel arrays, high sensitivity or high S/N can be obtained.

The selector 27c outputs any of RGB, monochrome, and monochrome (NIR) data according to the control of a controller 23.

Figure 23:
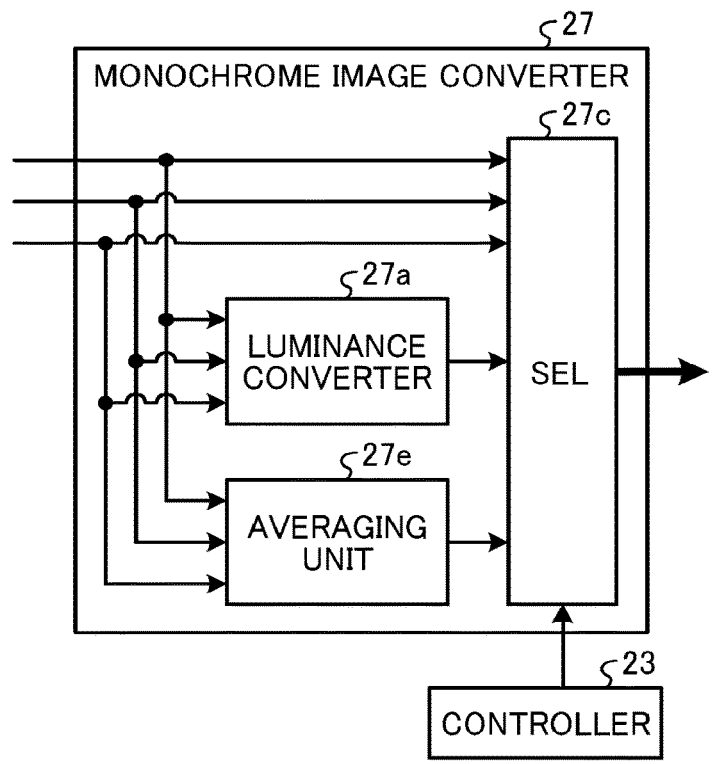
FIG. 23 is a diagram illustrating a modification of the configuration of the monochrome converter.

Here, FIG. 23 is a diagram illustrating a modification of the configuration of the monochrome converter 27. As illustrated in FIG. 23, the monochrome converter 27 includes an averaging unit 27e instead of the adder 27d.

The averaging unit 27e averages the signals obtained from RGB and performs monochrome conversion by averaging at the same time in the case of the invisible (NIR) reading mode. Thereby, a reading speed of the invisible image can be increased.

Figure 24:
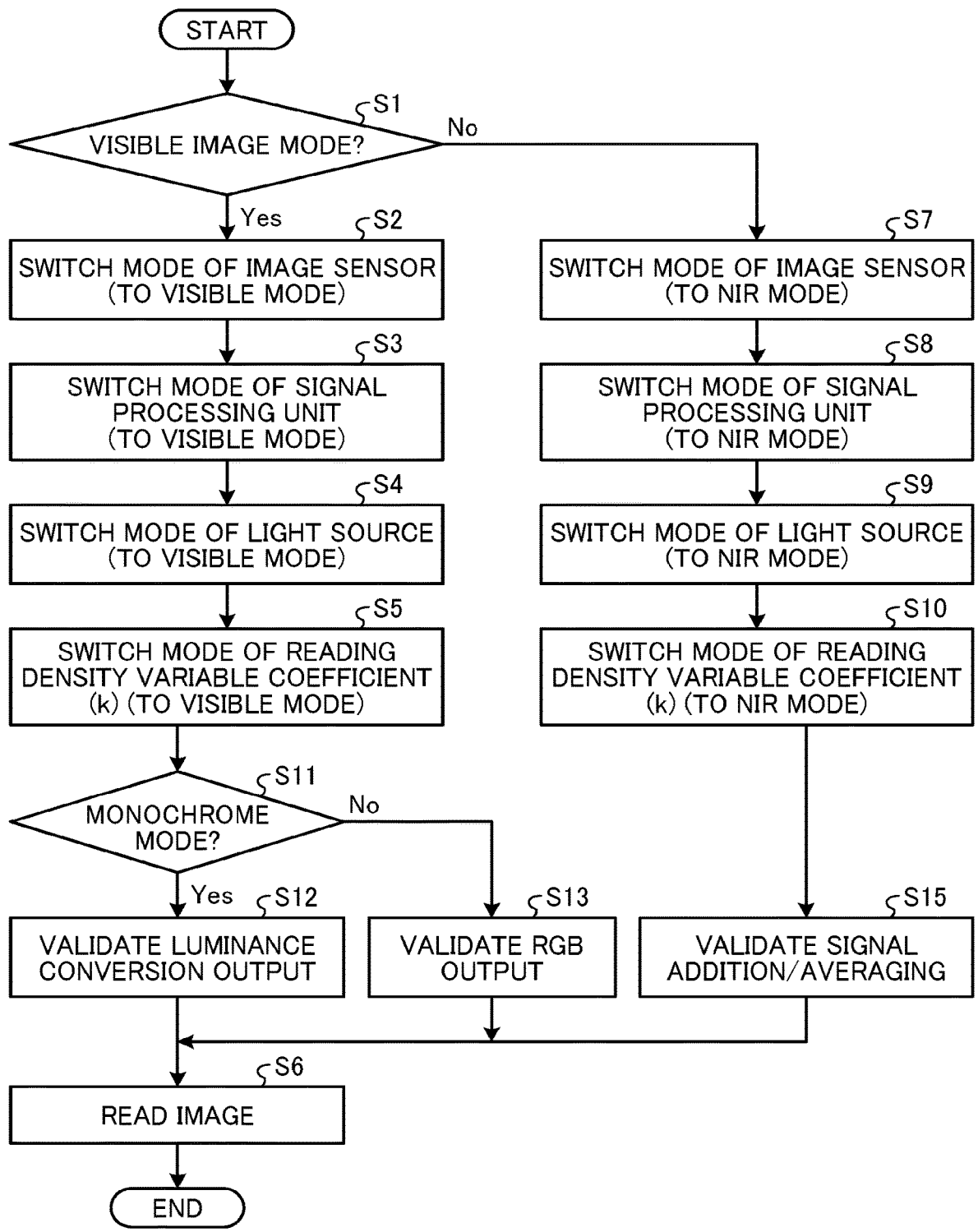
FIG. 24 is a flowchart schematically illustrating a flow of image reading processing.

Next, a flow of image reading processing by control of the controller 23 will be described. FIG. 24 is a flowchart schematically illustrating a flow of image reading processing. Note that processing in steps S1 to S10 is not changed from the processing described in FIG. 9, and thus description of the processing is omitted.

When the controller 23 executes mode switching of the reading density variable coefficient (k) to set the "NIR mode" (step S5), the controller 23 proceeds to step S11.

In step S11, the controller 23 determines whether a monochrome mode is designated in the case of a visible image mode. In the case where the monochrome mode is designated (Yes in step S11), the controller 23 proceeds to step S12. In step S12, the controller 23 validates an output of the monochrome data for which the luminance conversion has been performed by the luminance converter 27a of the monochrome converter 27, and the controller 23 proceeds to step S6.

In the case where the monochrome mode is not designated (No in step S11), the controller 23 proceeds to step S13. In step S13, the controller 23 validates the RGB output and proceeds to step S6.

Meanwhile, when the controller 23 executes the mode switching of the reading density variable coefficient (k) to set the "NIR mode" (step S10), the controller 23 proceeds to step S15.

In step S15, the controller 23 validates an output of the monochrome data for which the NIR-monochrome conversion has been performed by adding or averaging the signals in the case of the NIR image mode, and proceeds to step S6.

In the present embodiment, selection as to whether the monochrome mode is designated is not provided in the case of the NIR image mode. However, a configuration in which the selection may be provided to switch validity/invalidity of the monochrome conversion may be adopted.

As described above, according to the present embodiment, sensitivity or an S/N can be increased by adding or averaging the signals of the RGB pixel arrays in the case of the NIR image mode.

Eighth Embodiment

An eighth embodiment is different from the first to seventh embodiments in having a configuration to select a light source wavelength to be used for reading an invisible image from a plurality of wavelengths. Hereinafter, in the description of the eighth embodiment, description of the same part as the first to seventh embodiments is omitted and different parts from the first to seventh embodiments will be described.

Figure 25:
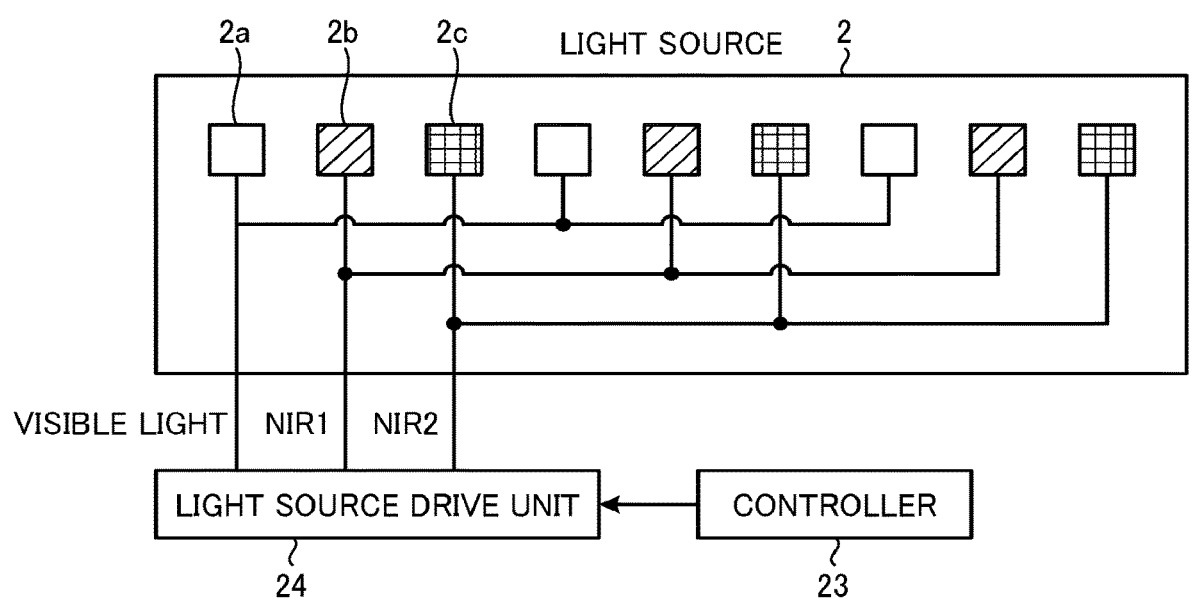
FIG. 25 is a diagram illustrating a configuration example of a light source according to an eighth embodiment.

FIG. 25 is a diagram illustrating a configuration example of a light source 2 according to the eighth embodiment. As illustrated in FIG. 25, the light source 2 has a visible light source 2a (white), a near infrared (NIR1) invisible light source 2b for reading an invisible image, and a near infrared (NIR2) invisible light source 2c for an invisible image arranged in turn in one light source.

Figure 26A:
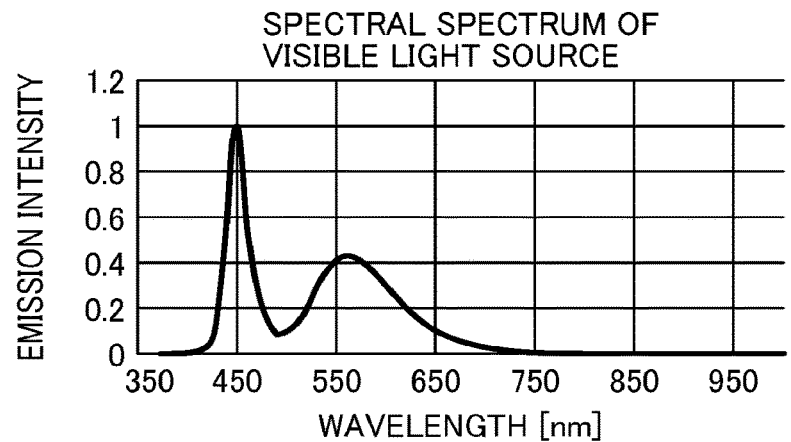
FIGS. 26A to 26C are diagrams illustrating spectra of light sources.
Figure 26B:
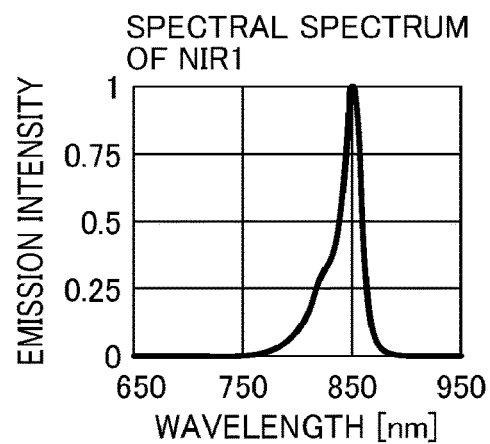
Figure 26C:
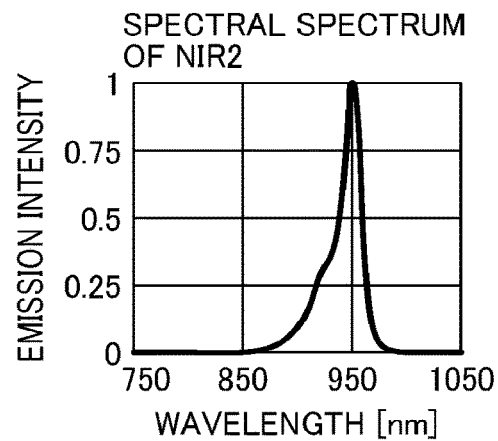

Here, FIGS. 26A to 26C are diagrams illustrating spectra of the light source 2. FIG. 26A illustrates a spectrum of a visible light source 2a, FIG. 26B illustrates a spectrum of an invisible light source 2b (NIR1), and FIG. 26C illustrates a spectrum of an invisible light source 2c (NIR2). FIGS. 26A, 26B, and 26C illustrate emission spectra of the visible light source 2a (white) in the case of an LED and the invisible light sources 2b and 2c (NIR1 and NIR2).

In FIGS. 4A and 4B, implementation of the visible reading mode and the invisible reading mode with the visible light source 2a and the invisible light source 2b (NIR1) (wavelength: 850 nm) has been described. In the present embodiment, an invisible light source 2c (NIR2) (wavelength: 950 nm) is added, and three modes of a visible reading mode, an invisible 1 reading mode, and an invisible 2 reading mode are adopted from the visible reading mode and the invisible reading mode. A light source drive unit 24 switches the light source 2 according to control of a controller 23.

The reason why the configuration to select the light source wavelength to be used for reading the invisible image from the plurality of types of wavelengths is implemented is that an image-readable object may be limited by limiting the light source wavelength to be used for reading the invisible image to one wavelength, when considering the fact that optical characteristics (spectral characteristics) are different depending on the object. That is, by selecting the light source wavelength to be used for reading the invisible image from the plurality of types of wavelengths, limitation of an object can be reduced.

Note that, in the present embodiment, an example in which the visible light source 2a (white), the invisible light source 2b (NIR1), and the invisible light source 2c (NIR2) are arranged in turn in one light source has been described. However, an embodiment is not limited to the example, and a three-light source configuration in which the visible light source 2a (white), the invisible light source 2b (NIR1), and the invisible light source 2c (NIR2) are configured as separate light sources may be adopted. Further, even in the case of configuring the visible light source 2a (white), the invisible light source 2b (NIR1), and the invisible light source 2c (NIR2) in one light source, the arrangement is not limited to the example, and a configuration having the light sources arranged in a plurality of lines may be adopted as long as the configuration is capable of illuminating an object as the light source 2.

Next, a flow of image reading processing by control of the controller 23 will be described.

Figure 27:
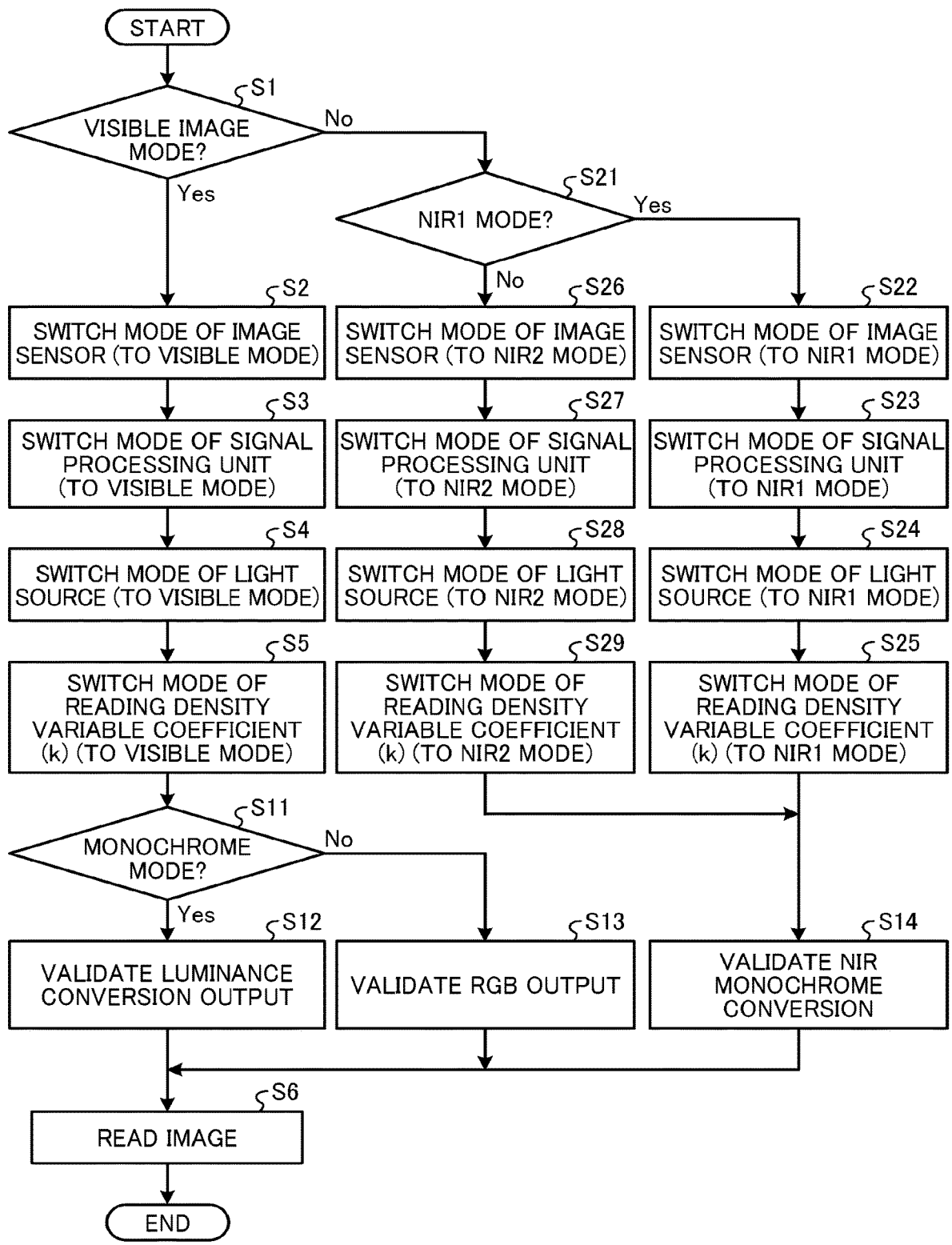
FIG. 27 is a flowchart schematically illustrating a flow of image reading processing.

FIG. 27 is a flowchart schematically illustrating a flow of image reading processing. Note that processing in steps S1 to S6 and steps S11 to S14 is not changed from the processing described in FIG. 18, and thus description of the processing is omitted.

In the case where the NIR image mode is designated (No in step S1), the controller 23 proceeds to step S21. In step S21, the controller 23 determines whether an NIR1 mode for reading the invisible image by the invisible light source 2b (NIR1: wavelength 850 nm) is designated.

In the case where the NIR1 mode is designated (Yes in step S21), the controller 23 proceeds to step S22. In step S22, the controller 23 executes mode switching of an image sensor 9 to set the "NIR1 mode".

Next, the controller 23 executes mode switching of a signal processing unit 21 to set the "NIR1 mode" (step S23), executes mode switching of the light source 2 to set the "NIR1 mode" (step S24), and executes mode switching of a reading density variable coefficient (k) to set the "NIR1 mode" (step S25).

Thereafter, in step S14, the controller 23 validates an output of the monochrome data for which the NIR-monochrome conversion has been performed by the NIR monochrome converter 27b of the monochrome converter 27 in the case of the NIR image mode, and proceeds to step S6.

Meanwhile, in a case where an NIR2 mode for reading the invisible image by the invisible light source 2c (NIR2: wavelength 950 nm) is designated (No in step S21), the controller 23 proceeds to step S26. In step S26, the controller 23 executes mode switching of the image sensor 9 to set the "NIR2 mode".

Next, the controller 23 executes the mode switching of the signal processing unit 21 to set the "NIR2 mode" (step S27), executes the mode switching of the light source 2 to set the "NIR2 mode" (step S28), and executes the mode switching of the reading density variable coefficient (k) to set the "NIR2 mode" (step S29).

Thereafter, in step S14, the controller 23 validates an output of the monochrome data for which the NIR-monochrome conversion has been performed by the NIR monochrome converter 27b of the monochrome converter 27 in the case of the NW image mode, and proceeds to step S6.

In the present embodiment, an example of switching the image sensor 9, the signal processing unit 21, and the reading density variable coefficient (k) in addition to the switching of the mode of the light source 2 has been described. However, switching processing for the setting of the image sensor 9 and the signal processing unit 21 is not required if there is no disadvantage in using common setting in the NIR1 mode and the NIR2 mode, such as commonly using the setting of the image sensor 9 and the signal processing unit 21 in the NIR1 mode and in the NIR2 mode.

Further, in the present embodiment, selection as to whether the monochrome mode is designated is not provided in the case of the NIR image mode. However, a configuration in which the selection may be provided to switch validity/invalidity of the monochrome conversion may be adopted.

As described above, according to the present embodiment, the configuration to select the light source wavelength to be used for reading the invisible image from the plurality of types of wavelengths, the limitation of an object can be reduced.

Ninth Embodiment

In the first to eighth embodiments, the configuration has been described in which one image reader is configured as a reading device to implement visible image reading/invisible image reading, but the ninth embodiment differs from the first to eighth embodiments in that the image reading unit of each of the visible image reading and the invisible image reading is separately configured. Hereinafter, in the description of the ninth embodiment, description of the same part as the first to eighth embodiments is omitted and different parts from the first to eighth embodiments will be described.

Figure 28:
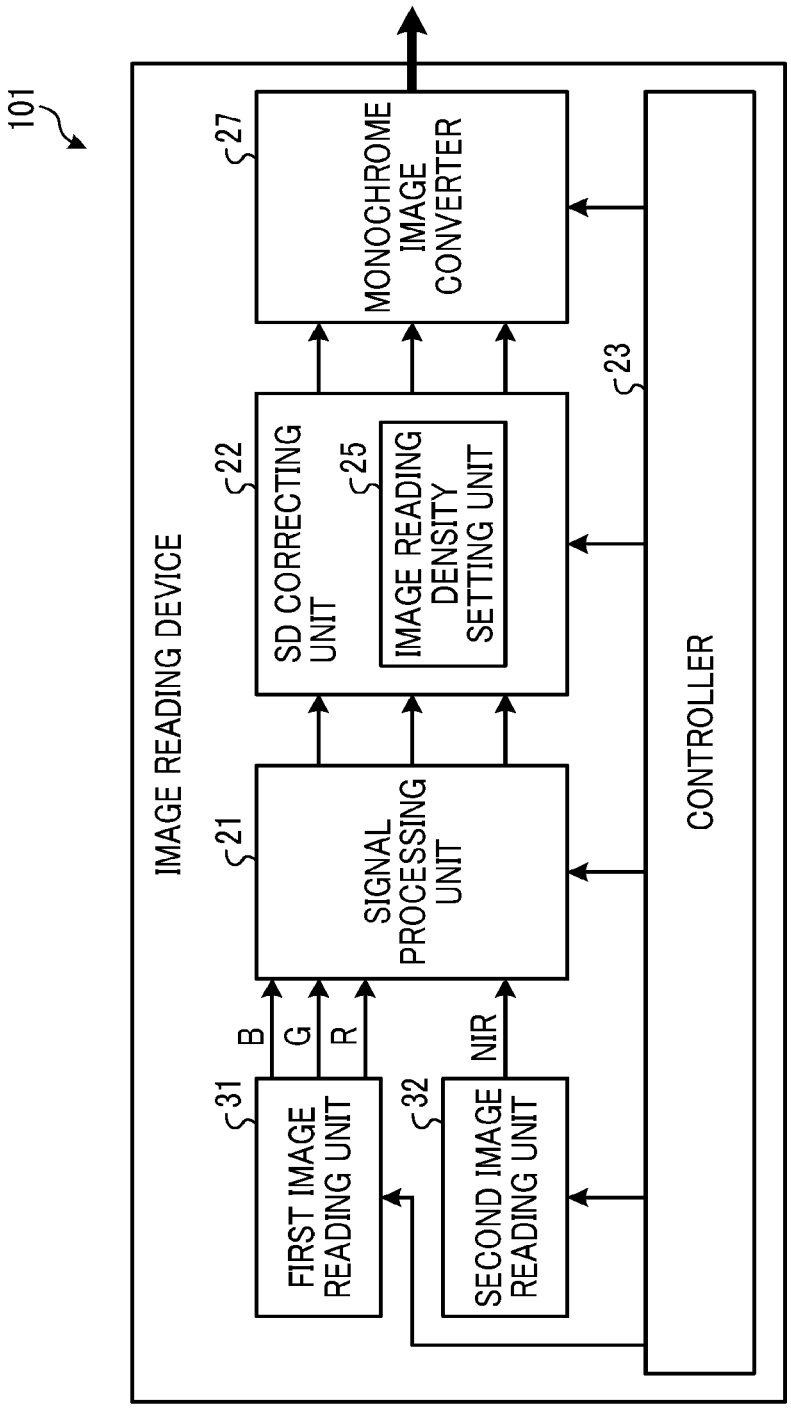
FIG. 28 is a block diagram illustrating electrical connection of each part constituting an image reader according to a ninth embodiment.

FIG. 28 is a block diagram illustrating electrical connection of each part constituting an image reader 101 according to the ninth embodiment. As illustrated in FIG. 28, the image reader 101 includes a first image reader 31 that is a first reader, a second image reader 32 that is a second reader, a signal processing unit 21, a shading (SD) correction unit 22, a controller 23, and a monochrome converter 27.

Figure 29A:
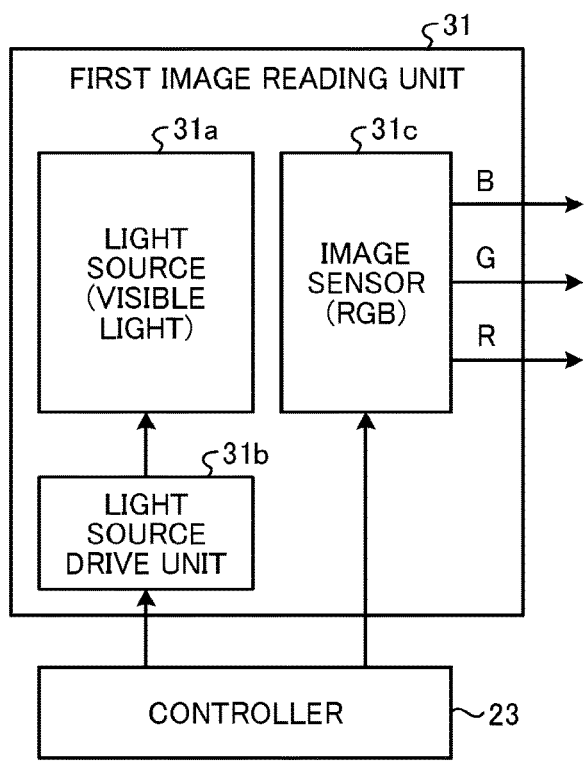
FIGS. 29A and 29B are block diagrams illustrating electrical connection of each part constituting a first image reader and a second image reader.
Figure 29B:
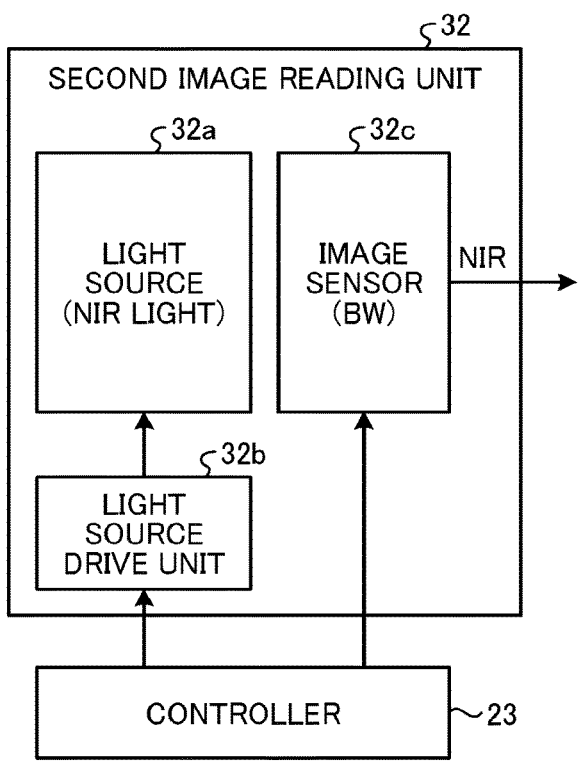

FIGS. 29A and 29B are block diagrams illustrating electrical connection of each part constituting a first image reader 31 and a second image reader 32. As illustrated in FIG. 29A, the first image reader 31 is used for visible image reading. The first image reader 31 includes a visible light source 31a, a light source drive unit 31b that drives the visible light source 31a, and an RGB image sensor 31c that is an imaging element.

Meanwhile, as illustrated in FIG. 29B, the second image reader 32 is used for invisible image reading. The second image reader 32 includes an invisible (NIR) light source 32a, a light source drive unit 32b that drives the invisible (NIR) light source 32a, and a monochrome image sensor 32c that is an imaging element.

The second image reader 32 may include an RGB image sensor instead of the monochrome image sensor 32c.

As described above, according to the present embodiment, by separately configuring the respective image readers for visible and invisible reading, the effects of the present invention can be easily obtained even in the case of using a conventional reading device having a single function.

In each of the above embodiments, the image forming apparatus of the present invention has been described by way of an example applied to a multifunction peripheral having at least two of the copy function, the printer function, the scanner function, and the facsimile function. However, the image forming apparatus of the present invention can be applied to any apparatus as long as the apparatus is an image forming apparatus such as a copier, a printer, a scanner apparatus, or a facsimile apparatus.

Furthermore, in the above embodiments, the reading device of the present invention has been described by way of an example applied to a multifunction peripheral. However, the reading device of the present invention is not limited thereto and can be applied to applications in various fields such as inspection in the FA Field.

Moreover, the reading device of the present invention is applicable also to a banknote reading device for the purpose of discrimination of banknote and forgery prevention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading device, comprising:
an imaging element configured to receive light from an object selectively irradiated with visible light or invisible light; and
correcting circuitry configured to
apply correction processing to an image signal to correct the image signal, based on a difference in an optical characteristic of the object between an invisible light region and a visible light region of the object, the image signal being a signal in the invisible light region and output from the imaging element, and output the corrected image signal.

2. A reading device configured to receive and read, with an imaging element, light from an object irradiated with light by a light source, the reading device comprising:

correcting circuitry configured to individually set a first reading density range of the object used in a first reading operation for executing correction using first reference data for first data of the object read in a visible light region, and a second reading density range used in a second reading operation for executing the correction using second reference data for second data of the object read in an invisible light region.

3. The reading device according to claim 2, wherein the correcting circuitry is further configured to obtain the first reference data and the second reference data based on a common reference white board.

4. The reading device according to claim 2, wherein the correcting circuitry is further configured to control the first reading density range read in the visible light region and the second reading density range read in the invisible light region to be equal.

5. The reading device according to claim 2, wherein the correcting circuitry is further configured to control the first and second reading density ranges based on an optical characteristic difference of the object between the visible light region and the invisible light region.

6. The reading device according to claim 5, wherein the optical characteristic difference used by the correcting circuitry to control the first and second reading density ranges is reflectance or transmittance.

7. The reading device according to claim 2, wherein the invisible light region for which the correcting circuitry sets the reading density range for the second reading operation is a near infrared region.

8. The reading device according to claim 7, wherein the near infrared region for which the correcting circuitry sets the reading density range for the second reading operation has a range of wavelength of from 800 to 1000 nm.

9. The reading device according to claim 2, further comprising:

reading control circuitry configured to selectively execute the first reading operation and the second reading operation, wherein the reading control circuitry is further configured to change a light emission wavelength of the light source to switch between the first reading operation and the second reading operation.

10. The reading device according to claim 9, wherein the reading control circuitry is further configured to execute the second reading operation using at least one pixel array of the imaging element used in the first reading operation.

11. The reading device according to claim 2, further comprising:

reading control circuitry configured to selectively execute the first reading operation and the second reading operation, wherein the reading control circuitry is further configured to change a wavelength received by the imaging element to switch between the first reading operation and the second reading operation.

12. The reading device according to claim 11, further comprising:

an optical filter at a preceding stage of the imaging element, wherein the reading control circuitry is further configured to change the wavelength according to a change of a transmission characteristic of the optical filter.

13. The reading device according to claim 12, wherein the reading control circuitry is further configured to execute the second reading operation using a pixel array having a different transmission characteristic from a pixel array of the imaging element used in the first reading operation.

14. The reading device according to claim 2, wherein the correcting circuitry includes a plurality of processing lines configured to execute the correction for a signal from the imaging element in the first reading operation and the second reading operation, wherein, in the plurality of processing lines, at least one of first processing lines to execute the correction on visible information signals obtained in the first reading operation and at least one of second processing lines to execute the correction on invisible information signals obtained in the second reading operation are a same processing line.

15. The reading device according to claim 14, wherein the first processing lines to execute the correction on the visible information signals are configured to correspond to, respectively, the second processing lines to execute the correction on the invisible information signals, wherein a same signal is input to each of the first processing lines to execute the correction on the visible information signals and corresponding one of the second processing lines to execute the correction on the invisible information signals.

16. The reading device according to claim 14, wherein the correcting circuitry is further configured to control reading density ranges of each of the plurality of processing lines, to execute the correction on the invisible information signals, to be equal.

17. The reading device according to claim 14, further comprising:

a monochrome converter provided at a subsequent stage of the correcting circuitry and configured to perform monochrome processing for an invisible information signal.

18. The reading device according to claim 17, wherein the monochrome converter is further configured to apply a same monochrome processing for a visible information signal as the monochrome processing for the invisible information signal, and output the visible information signal and the invisible information signal without distinction.

19. The reading device according to claim 17, wherein the monochrome converter is further configured to add the invisible information signals of the plurality of second processing lines in the monochrome processing for the invisible information signal.

20. The reading device according to claim 17, wherein the monochrome converter is further configured to average the invisible information signals of the second processing lines in the monochrome processing for the invisible information signal.

21. The reading device according to claim 14, wherein processing of a second processing line not used in the second reading operation is stopped in the imaging element or in the correcting circuitry.

22. The reading device according to claim 2, wherein read resolutions of the imaging element are identical in the first reading operation and in the second reading operation.

23. The reading device according to claim 2, wherein a wavelength of the invisible region, for which the correcting circuitry sets the reading density range for the second reading operation, is selected from a plurality of types of wavelengths.

24. The reading device according to claim 2, further comprising:
- a first reader configured to read visible information in the first reading operation, the first reader including a visible light source and an RGB imaging element; and
- a second reader configured to read invisible information in the second reading operation, the second reader including an invisible light source and a monochrome imaging element.

25. An image forming apparatus comprising:
the reading device according to claim 2;
a document support device configured to position a document with an image to be read by the reading device to a reading position of the reading device; and
an image forming device configured to form the image read by the reading device.

26. An image forming apparatus comprising:
the reading device according to claim 1;
a document support device configured to position a document with an image to be read by the reading device to a reading position of the reading device; and
an image forming device configured to form the image read by the reading device.

27. A reading method, comprising:
applying correction processing to an image signal to correct the image signal, based on a difference in an optical characteristic of an object between an invisible light region and a visible light region of the object, the image signal being a signal in the invisible light region and output from an imaging element configured to receive light from the object, which is selectively irradiated with visible light or invisible light; and
outputting the corrected image signal.

28. A reading method for a reading device configured to receive and read, with an imaging element, light from an object irradiated with light by a light source, the reading method comprising:
individually setting a first reading density range of the object used in a first reading operation for executing correction using first reference data for first data of the object read in a visible light region, and a second reading density range used in a second reading operation for executing the correction using second reference data for second data of the object read in an invisible light region.

29. A non-transitory recording medium storing computer-readable program code that, when executed by one or more processors, causes the processors to perform:
applying correction processing to an image signal to correct the image signal, based on a difference in an optical characteristic of an object between an invisible light region and a visible light region of the object, the image signal being a signal in the invisible light region and output from an imaging element configured to receive light from the object, which is selectively irradiated with visible light or invisible light; and
outputting the corrected image signal.

30. A non-transitory recording medium storing computer-readable program code that causes a reading device to perform a reading method, the reading device configured to receive and read, with an imaging element, light from an object irradiated with light by a light source, the reading method comprising:
individually setting a first reading density range of the object used in a first reading operation for executing correction using first reference data for first data of the object read in a visible light region, and a second reading density range used in a second reading operation for executing the correction using second reference data for second data of the object read in an invisible light region.

* * * * *